United States Patent
Juste Jordán et al.

(10) Patent No.: US 12,491,216 B2
(45) Date of Patent: Dec. 9, 2025

(54) IMMUNOSTIMULANT FOR USE AGAINST PATHOGENS

(71) Applicants: SABIOTEC SPIN-OFF, S.L., Ciudad Real (ES); NEIKER—Instituto Vasco de Investigación y Desarrollo Agrario, S.A., Vitoria-Gasteiz (ES)

(72) Inventors: Ramón Antonio Juste Jordán, Bizkaia (ES); Lucas Domínguez Rodríguez, Madrid (ES); Christian Gortázar Schmidt, Cuidad Real (ES); José de Jesús De La Fuente García, Ciudad Real (ES); Joseba M. Garrido Urkullu, Bizkaia (ES); Iker Agirregomoskorta Sevilla, Bizkaia (ES); Mercedes Domínguez Rodríguez, Madrid (ES)

(73) Assignees: NEIKER—INSTITUTO VASCO DE INVESTIGACION Y DESARROLLO AGRARIO, S.A., Vitoria-Gasteiz (ES); SABIOTEC SPIN-OFF, S.L., Ciudad Real (ES)

(*) Notice: Subject to any disclaimer, the term of this patent is extended or adjusted under 35 U.S.C. 154(b) by 908 days.

(21) Appl. No.: 17/298,755

(22) PCT Filed: Dec. 4, 2019

(86) PCT No.: PCT/EP2019/083730
§ 371 (c)(1),
(2) Date: Jun. 1, 2021

(87) PCT Pub. No.: WO2020/115161
PCT Pub. Date: Jun. 11, 2020

(65) Prior Publication Data
US 2022/0054557 A1    Feb. 24, 2022

(30) Foreign Application Priority Data
Dec. 4, 2018 (EP) .................................. 18382892

(51) Int. Cl.
*A61K 35/74*    (2015.01)
*A61P 3/02*     (2006.01)
(Continued)

(52) U.S. Cl.
CPC .............. *A61K 35/74* (2013.01); *A61P 31/04* (2018.01); *A61P 33/02* (2018.01)

(58) Field of Classification Search
None
See application file for complete search history.

(56) References Cited

U.S. PATENT DOCUMENTS 8,287,879 B2  10/2012  Horwitz et al.
8,383,132 B2   2/2013  Horwitz et al.
(Continued)

FOREIGN PATENT DOCUMENTS

EP    2049667 B1    3/2011
EP    1997881 B1    4/2013
(Continued)

OTHER PUBLICATIONS

World Health Organization; Weekly epidemiological record; 8; 93, 73-96, 2018 (Year: 2018).*
(Continued)

*Primary Examiner* — David W Berke-Schlessel
(74) *Attorney, Agent, or Firm* — HULTQUIST, PLLC; Steven J. Hultquist

(57) ABSTRACT

The present invention relates to compositions comprising an inactivated *Mycobacterium* or an immunogenic fraction thereof, for use in the prevention of an infection in a subject, wherein the infection is selected from the group consisting
(Continued)

Figure 1:
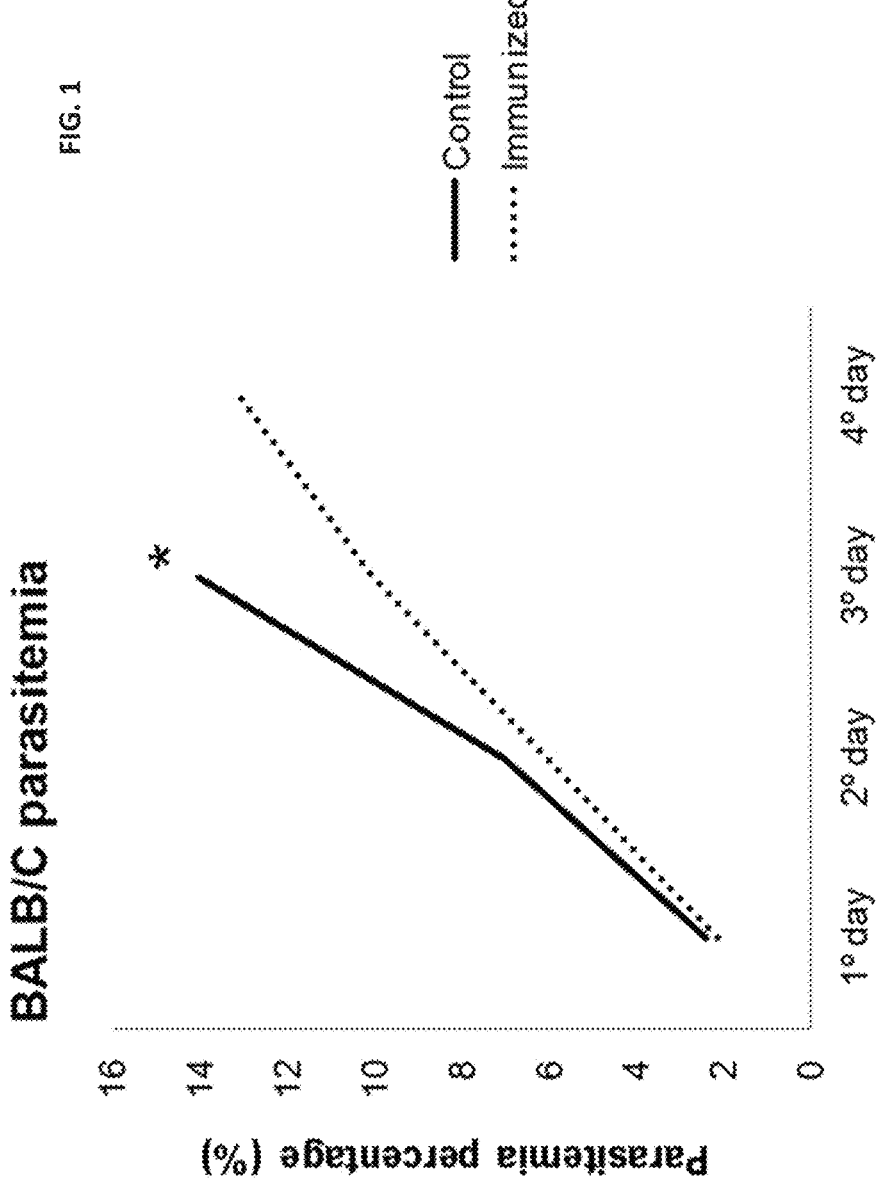

of a protozoan parasitic infection and a bacterial infection, with the proviso that the infection is not caused by a *Mycobacterium*.

13 Claims, 10 Drawing Sheets

Specification includes a Sequence Listing.

(51) Int. Cl.
    *A61P 31/04*     (2006.01)
    *A61P 33/02*     (2006.01)

(56) References Cited

U.S. PATENT DOCUMENTS

| | | |
|---|---|---|
| 8,642,011 B2 | 2/2014 | Montanes et al. |
| 9,078,844 B2 | 7/2015 | Laufer et al. |
| 2015/0174229 A1 | 6/2015 | Cardona Iglesias et al. |
| 2017/0151319 A1 | 6/2017 | Nowill |

FOREIGN PATENT DOCUMENTS

| | | |
|---|---|---|
| EP | 2687227 B1 | 8/2018 |
| WO | 2000047225 A | 8/2000 |
| WO | 2003049752 A2 | 6/2003 |
| WO | 2003051288 A2 | 6/2003 |
| WO | 2005037222 A2 | 4/2005 |
| WO | 2006045468 A1 | 5/2006 |
| WO | 2006114680 A2 | 11/2006 |
| WO | 2007071978 A1 | 6/2007 |
| WO | 200812693 A2 | 1/2008 |
| WO | 2008128065 A2 | 10/2008 |
| WO | 2002056906 A2 | 11/2010 |
| WO | 2010127132 A1 | 11/2010 |
| WO | 2011018769 A1 | 2/2011 |
| WO | 2012145491 A2 | 10/2012 |

OTHER PUBLICATIONS

Armijos, RX; et al; "Safety, immunogenicity, and efficacy of an autoclaved Leishmania amazonensis vaccine plus BCG adjuvant against New World cutaneous leishmaniasis" Vaccine, 22, 1320-1326, 2004 (Year: 2004).*

Murphy, James R; Host Defense in Murine Malaria: Nonspecific Resistance to Plasmodium berghei Generated in Response to Mycobacterium bovis Infection or Cornyebacterium parvum Stimulation Infection and Immunity, 33, 199-211, 1981 (Year: 1981).*

Clark, IA; et al; "Protection of mice against Babesia and Plasmodium with BCG" Nature, 259, 309-311, 1976 (Year: 1976).*

Rudinko, N., et al., "Detection of Borrelia burgdorferi sensu stricto ospC alleles associated with human Lyme borreliosis worldwide in non-human-biting tick Ixodes affinis and rodent hosts in southeastern United States", Applied and Environmental Microbiology, 2013, pp. 1444-1453, vol. 79, No. 5.

Sakuma, T., et al., "Mechanisms of enhanced resistance of Mycobacterium bovis BCG-treated mice to ectromelia virus infection", Infection and Immunity, 1983, pp. 567-573, vol. 42, No. 2, Publisher: American Society for Microbiology.

Sergent, E., et al., "Premunition antituberculeuse par le BCG. Campagne controlee poursuivie a Alger dupuis 1935.", Arch L'Institut Pasteur d'Algerie, 1960, pp. 131-137, vol. 38.

Shirtcliffe, PM, et al., "Effect of repeated intradermal injections of heat-inactivated Mycobacterium bovis bacillus Calmette-Guerin in adult asthma", Clinical & Experimental Allergy, 2004, pp. 207-212, vol. 34, Publisher: Blackwell Publishing Ltd.

Steenhuis, T.J., et al., "Bacille-Calmette-Guerin vaccination and the development of allergic disease in children: A randomized, prospective, single-blind study", Clinical and Experimental Allergy, 2008, pp. 79-85; doi: 10.1111/j.1365-2222.2007.02859.x, vol. 38, Publisher: Blackwell Publishing Ltd.

Strutt, TM, et al., "Memory CD4+ T cells induce innate responses independently of pathogen", Nature Medicine, 2010, pp. 558-565; doi:10.1038/nm.2142, vol. 16, No. 5, Publisher: Nature America Inc.

Sun, JC, et al., "Adaptive immune features of natural killer cells", Nature, 2009, pp. 557-561; doi:10.1038/nature07665, vol. 457, Publisher: Macmillan Publishers Limited.

Trunz, BB, et al., "ffect of BCG vaccination on childhood tuberculous meningitis and miliary tuberculosis worldwide: a meta-analysis and assessment of cost- effectiveness", The Lancet, 2006, pp. 1173-1180, vol. 367, Publisher: www.thelancet.com.

Van't Wout, JW, et al., "The role of BCG/PPD-activated macrophages in resistance against systemic candidiasis in mice", Scand J. Immunol, 1992, pp. 713-719, vol. 36.

Vaugelade, J., et al., "Non-specific effects of vaccination on child survival: Prospective cohort study in Burkina Faso", BMJ, 1991, pp. doi:10.1136/bmj.38261.496366.82, Publisher: bmj.com.

Velema, JP, et al., "Childhood mortality among users and non-users of primary health care in a rural west African community", Int J Epidemiol, 1991, pp. 474-479, vol. 20.

Mbovis.org, "Mycobacterium bovis Spoligotype Database", 2021.

Youmans , G., et al., "Immunizing Capacity of Viable and Killed Attenuated Mycobacterial Cells Against Experimental Tuberculosis Infection", Journal of Bacteriology, 1969, pp. 107-113, vol. 97, No. 1, Publisher: American Society for Microbiology.

Zheng, Y-Q, et al., "Applications of bacillus Calmette-Guerin and recombinant bacillus Calmette-Guerin in vaccine development and tumorimmuno therapy", Expert Rev Vaccines, 2015, pp. 1255-1275, vol. 14, No. 9, Publisher: HHS Public Access.

Aaby, P., et al., "Randomized trial of BCG vaccination at birth to low-birth-weight children: Beneficial nonspecific effects in the neonatal period?", J Infect Dis, 2011, pp. 245-252, vol. 204, No. 2, Publisher: Oxford University Press.

Aaby, P., et al., "Saving lives by training inate immunity with bacille Calnette-Guerin vaccine", Proc Natl Acad Sci USA, 2012, pp. 17317-17318, vol. 109.

Abe, I., "Abstract: this article reports immunization and immunological experiments on tuberculosis in mice by administration of Bcg. Bcg was effective in preventing the growth of bacteria", Kekkaku, 1953, pp. 409-410, vol. 28.

Aronson, J.D., "Protective vaccination against tuberculosis, with special reference to BCG vaccine", Minnesota Medicine, 1948, pp. 1336, vol. 31.

Beltran-Beck, B., et al., "Assessment of an Oral Mycobacterium bovis BCG Vaccine and an Inactivated M.bovis Preparation for Wild Boar in Terms of Adverse Reactions, Vaccine Strains Survival , and Uptake by Nontarget Species", Clinical and Vaccine Immunology, 2014, pp. 12-20, vol. 21, No. 1, Publisher: American Society for Microbiology.

Beltran-Beck, B., et al., "Oral vaccination with heat activated Mycobacterium bovus activated the compliment system to protect against tuberculosis", PLoS One, 2014, pp. e98048, vol. 9, No. 5, Publisher: CrossMark.

Biering-Sorensen, S., et al., "Small Randomized Trial Amont Low-Birth Weight Children Receiving Bacillus Calmette Guerin Vacinnation At First Health Center Contact", The Pediatric Infectious Disease Journal, 2012, pp. 306-308, vol. 31, No. 3, Publisher: Lippencott Williams and Wilkins.

Biering-Sorensen, S., et al., "Early BCG-Denmark and Neonatal Mortality Among Infants Weighing Less Than 2500 g: A Randomized Controlled Trial", Clinical Infectious Diseases, 2017, pp. 1183-1190, vol. 65, No. 7, Publisher: Infectious Diseases Society of America.

Billiau, A., et al., "Modes of Action of Freunds adjuvants in experimental models of autoimmune disease", Journal of Leucocyte Biology, 2001, pp. 849-860, vol. 70, Publisher: http://www.jleukbio.org.

Biswas, S., et al., "Macrophage platicity and interaction with lymphocyte subsets: cancer as a paradigm", Nature Immunology, 2010, pp. 889-896; DOI:10.1038/ni.1937, vol. 11, No. 10, Publisher: NPG.

(56) References Cited

OTHER PUBLICATIONS

Bowdish, D.M., et al., "Macrophage receptors implicated in the adaptive form of innate immunity", Microbes Infect, 2007, pp. 1680-1687, vol. 9.

Buffett, P.A., et al., "Culture Microtitration: a Sensitive Method for Quantifying Leishmania infantum in Tissues of Infected Mice", Antimicrobial Agents and Chemotherapy, 1995, pp. 2167-2168, vol. 39, No. 9, Publisher: American Society for Microbiology.

Chedid, L., et al., "Ehnancement of nonspecific immunity to Klebsiella pneumoniae infection by a synthetic immunoadjuvant N-acetylmuremyl-L-alanyl-D-isoglutamine and several analogs", Immunology, 1977, pp. 2089-2093, vol. 74, No. 5, Publisher: Proc. Natl. Acad. Sci. USA.

Clark, K., et al., "Molecular Identification and Analysis of Borelia burgdorferi Sensu Lato in Lizards in the Southeastern United States", Applied and Environmental Biology, 2005, pp. 2616-2625, vol. 71, No. 5, Publisher: American Society for Microbiology.

Cooper, M., et al., "Cytokine-induced memory-like natural killer cells", 10.1073/pnas, 2008, pp. 1915-1919; doi:10/1073/pnas. 013192016, vol. 106, No. 6, Publisher: www.pnas.org/cgi.

Dai, J., et al., "Antibodies against a Tick Protein, Scalp 15, Protect Mice from Lyme Disease Agent", Cell Host & Microbe, 2009, pp. 482-492, vol. 6, Publisher: Cell Press.

De La Fuente, et al., "Comparative Genomics of Field Isolates of Mycobacterium bovis andM. caprae Provides Evidence for Possible Correlates with Bacterial Viability and Virulence", PLOS Neglected Tropical Diseases, 2015, pp. DOI:10.1371/journal.pntd.0004232, vol. 9, No. 11, Publisher: CrossMark.

De La Fuente, et al., "Complete Genome Sequences of Field Isolates of Mycobacterium bovis and Mycobacterium caprae", Genome Announcements, 2015, pp. e00247-15, vol. 3, No. 3, Publisher: CrossMark.

Diez-Delgado, L., et al., "Patenteral Vaccination with Heat-Inactivated Mycobacterium Bovis Reduces the Prevalence of Tuberculosis-Compatible Lesions in Farmed Wild Boar", Transboundary and Emerging Diseases, 2016, pp. 1-4; e18-e21, vol. 64, No. 5, Publisher: Blackwell Verlag GmbH.

Durant, W.E., et al., "Systemic Acquired Resistance", Annu Rev. Phytopathol, 2004, pp. 185-205; doi:10.1146/annurev.phyto.42. 040803.140421, vol. 42.

Dye, C., "After 2015 infectious diseases in a new era of health and development", Philosophical Transactions of the Royal Society, 2014, pp. 20130426, vol. B369, Publisher: rstb.royalsocietypublishing. org.

Ferguson, R.G., et al., "BCG Vaccination of Indian Infants in Saskatcehwan", Tubercle, 1949, pp. 1-11, vol. 30.

Fine, PC, "Variation in protection by BCG: Implications of and for heterologous immunity", Lancet, 1995, pp. 1339-1345, vol. 346.

Garly, M.L., et al., "BCG scar and positive tuberculin reaction associated with reduced child mortality in West Africa. A non-specific beneficial effect of BCG?", Vaccine, 2003, pp. 2782-2790, vol. 21, Publisher: Elsevier.

Garrido, J.M., et al., "Protection against Tuberculosis in Eurasian Wild Boar Vaccinated with Heat-Inactivated Micobacterium bovis", PLoS ONE, 2011, pp. e24905, vol. 6, No. 9.

Gorhe, DS, "Inhibition of multplication of foot and mouth disease virus in adult mice pretreated with Freund's adjuvant", Nature, 1967, pp. 1242-1244, vol. 216, Publisher: Nature Publishing Group.

Kleinnijenhuis, J., et al., "Bacille Calmette-Guerin induces NOD2-dependent nonspecific protection from reinfection via epigenetic reprogramming of monocytes", PNAS, 2012, pp. 17537-17542, vol. 109, No. 43.

Kristensen, I., et al., "Routine vaccinations and child survival Follow up study in Guinea-Bissau, West Africa", BMJ, 2000, pp. 1-7, vol. 321, Publisher: bmj.com.

Levine, M.I., et al., "Results of BGG immunization in New York City", AM Rev Tuberc, 1946, pp. 517-532, vol. 53.

Locati, M., et al., "Macrophage activation and polarization as an adaptive component of innate immunity", Advances in Immunology, 2013, pp. 163-184; http://dx.doi.org/10.1016/B978-0-12-417028-5.00006-5, vol. 120, Publisher: Elsevier.

Lopez, V., et al., "Heat-inactivated Mycobacterium bovis protects zebrafish against mycobacteriosis", Journal of Fish Diseases, 2018, pp. 1515-1528, vol. 41, No. 10, Publisher: Wiley.

Naslund, C., "Resultats des experiences de vaccination par le BCG poursuivies dans le Norrbotten Suede Septembre 1927-Decembre1931. ", Vaccinaltion Preventative de Tuberculose, 1932, pp. 2754-284, Publisher: Rappaports et Documents, Institute Pasteur, Paris.
Netea, MG, et al., "Trained Immunity: A Memory for Innate Host Defense", Cel Host &Microbe, 2011, pp. 355-361, vol. 9, Publisher: Cell Press.
Niobey, FM, et al., "Risk factors for death caused by pneumonia in children younger than 1 year old in a metropolitan region of southeastern Brazil. A case control study.", Rev. Saude Publica, 1992, pp. 229-238, vol. 26, No. 4.
Palmer, MV, et al., "Persistence of Micobacterium bovis Bacillus Calmette-Guerin in White-Tailed Deer Odocoileus Virginianus after Oral or Parenteral Vaccination", Zoonoses Public Health, 2010, pp. e206-e212, vol. 57, Publisher: Blackwell Verlag GmbH.
Palmer, MV, et al., "Persistence of Microbacterium bovis bacillus Calmette-Guerin bcg Danish in White-tailed Deer Odocoileus virginianus Vaccinated with a Lipid-Formulated Oral Vaccine", Transboundary and Emerging Diseases, 2014, pp. 266-272, vol. 61.
Perez De Val, B., et al., "Assessment of safety and interferon gamma responses of Mycobacterium bovis BCG vaccine in goat kids and milking goats", Vaccine, 2016, pp. http:///doi.org.10.1016/j.vaccine.2016.01.004, Publisher: Elsevier.
Pham, LN, et al., "A Specific Primed Immune Response in Drosophila is Dependent on Phagocytes", PLoS Pathogens, 2007, pp. e26; 0001-0008, vol. 3, No. 3, Publisher: www.plospathogens.org.
Risalde, MA, et al., "Control of mycobacteriosis in zebrafish Danio rerio mucosally vaccinated with heat-inactivated Mycobacterium bovis", Vaccine, 2018, pp. 4447-4453; https://doi.org/10.1016/j.vaccine.2018.06.042, vol. 36, Publisher: Elsevier.
Rodrigues, J., et al., "Hemocyte differentiation mediates innate immune memory in Anopheles bambiae mosquitoes", Science, 2010, pp. 1353-1355, vol. 329, Publisher: www.sciencemag.org.
Rosapina, S., et al., "The bactericidal effect of microwaves on Mycobacterium bovis dried on scalpel blades", Journal of Hospital Infection, 1994, pp. 45-50, vol. 26.
Rosenthal, SR, et al., "Bcg Vaccination in Tuberculosis Households", Am Rev Respir Dis, 1961, pp. 690-704, vol. 84.
Roy, A., et al., "Response of goats to intramuscular vaccination with heat-killed Mycobacterium bovis and natural challenge", Comparative Immunology, Microiology and Infectious Diseases, 2018, pp. 28-34, vol. 60, Publisher: Elsevier.

* cited by examiner

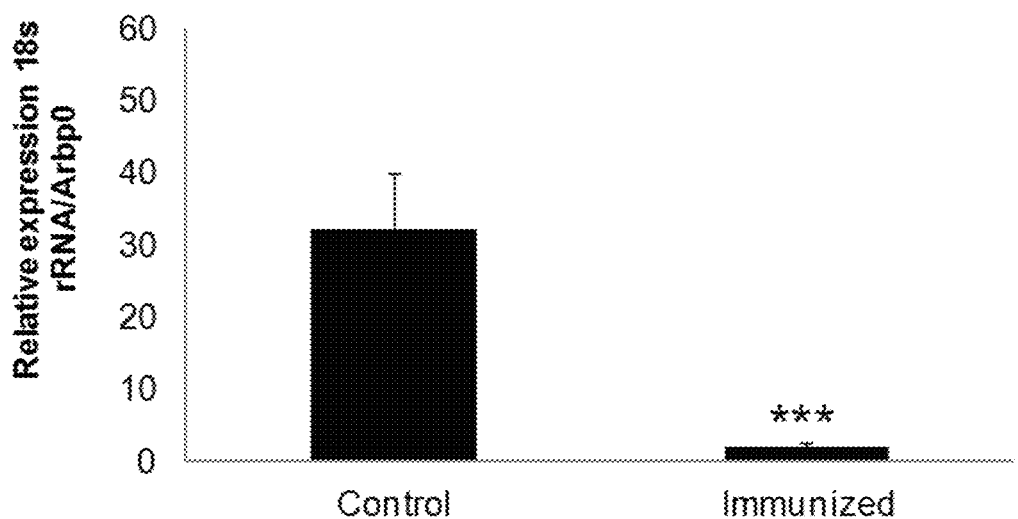
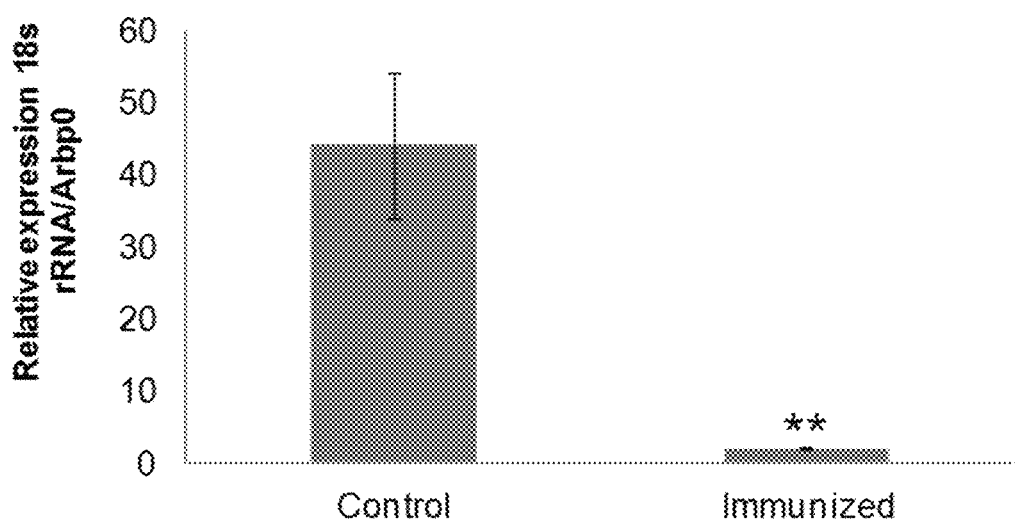
FIG. 2

IMMUNOSTIMULANT FOR USE AGAINST PATHOGENS

CROSS-REFERENCE TO RELATED APPLICATIONS

This is a U.S. National Phase under 35 USC § 371 of International Patent Application No. PCT/EP19/83730 filed Dec. 4, 2019, which in turn claims priority under 35 USC § 119 of European Patent Application No. 18382892.0 filed Dec. 4, 2018. The disclosures of such applications are hereby incorporated herein by reference in their respective entireties, for all purposes.

REFERENCE TO SEQUENCE LISTING SUBMITTED VIA EFS-WEB

This application includes an electronically submitted sequence listing in .txt format. The .txt file contains a sequence listing entitled "239_SeqListing_ST25.txt" created on May 31, 2021 and is 1783 bytes in size. The sequence listing contained in this .txt file is part of the specification and is hereby incorporated by reference herein in its entirety.

FIELD OF THE INVENTION

The invention relates to the field of infectious diseases and immunology, specifically to an immunostimulant of trained immunity for use against pathogens. In particular, the invention relates to a composition comprising an inactivated *Mycobacterium* for use in the prevention of infectious diseases other than mycobacteriosis.

BACKGROUND OF THE INVENTION

Infectious diseases are caused by pathogenic microorganisms, such as bacteria, viruses, parasites or fungi. Human infectious diseases can be spread directly from one person to another, or indirectly, through an intermediate host animal. In addition, zoonotic diseases are infectious diseases of animals that can cause disease when transmitted to humans. Nowhere in the world have infectious diseases yet become a negligible cause of illness and death, even if the number of deaths caused by pathogens and parasites worldwide is falling slowly. In 1990, an estimated 16 million people died from infections (plus maternal and nutritional disorders). In 2010, the number of deaths had fallen only to 15 million (a decline of only 1% per year). And the World Health Organization (WHO) forecasts 13 million deaths attributed to these causes in 2050 (Dye C. 2014, After 2015: infectious diseases in a new era of health and development. Phil. Trans. R. Soc. B 369: 20130426.).

Leishmaniasis, malaria, Lyme disease (also known as Lyme borreliosis) and salmonellosis are particular examples of infectious diseases caused by parasites or bacteria.

Leishmaniasis is a disease caused by parasites of the *Leishmania* genus, which is spread by the bite of certain types of sandflies. The disease may also occur in a number of other animals, including dogs and rodents. About 4 to 12 million people are currently infected in some 98 countries and about 2 million new cases and between 20 and 50 thousand deaths occur each year. The treatment is determined by where the disease is acquired, the species of *Leishmania*, and the type of infection. Drug development by pharmaceutical companies has occasionally been abandoned because it would not be profitable, as the disease mostly affects poor people. However, organizations such as The Drugs for Neglected Diseases Initiative are actively facilitating the search for novel therapeutics. As of 2016, no vaccine for humans was available.

Malaria is a mosquito-borne infectious disease affecting humans and other animals caused by parasitic protozoans belonging to the *Plasmodium* genus. The disease is widespread in tropical and subtropical regions, including much of Sub-Saharan Africa, Asia, and Latin America. In 2016, there were 216 million cases of malaria worldwide resulting in an estimated 731,000 deaths. Drug resistance poses a growing problem in 21st-century malaria treatment. The only approved vaccine as of 2015 is RTS,S. It requires four injections, and has a relatively low efficacy (26-50%).

Lyme disease, also known as Lyme borreliosis, is an infectious disease caused by bacteria of the *Borrelia* genus which is spread by ticks. Lyme disease is the most common disease spread by ticks in the Northern Hemisphere. It is estimated to affect 300,000 people a year in the United States and 65,000 people a year in Europe. Antibiotics are the primary treatment. A Lyme vaccine was marketed in the US between 1998 and 2002. However, it was withdrawn from the market due to poor sales and rumors about adverse effects.

Salmonellosis is an infectious disease caused by bacteria of the *Salmonella* genus. Salmonellosis is one of the most common causes of diarrhea globally. In 2015, 90,300 deaths occurred from non-typhoidal and 178,000 deaths from typhoidal salmonellosis worldwide. In Europe it is the second most common foodborne disease. Appropriate antibiotics may be given to kill the bacteria, but are unnecessary in most cases. There are specific recommendations on choice of antibiotic to avoid promoting antibiotic resistance. A 2014 study tested a vaccine on chickens which offered efficient protection against salmonellosis.

There is thus an increasing need in the art to develop new alternative preventive treatments which are capable of effectively preventing infectious disease in humans and in animals, particularly preventive treatments which are capable of preventing a parasitic infection or a bacterial infection.

SUMMARY OF THE INVENTION

The authors of the present invention have surprisingly found that a composition comprising heat inactivated *Mycobacterium bovis* is able to provide a protective effect against infections other than tuberculosis (TB). The composition has been successfully used in the protection against protozoan parasitic infections and bacterial infections. In particular, the administration of the inactivated *Mycobacterium* has shown promising protective properties in subjects infected with protozoa from the genus *Leishmania* or *Plasmodium*, or wherein the bacterial infection is caused by bacteria from the genus *Borrelia* or *Salmonella*.

Thus, the invention relates to a composition comprising an inactivated *Mycobacterium bovis* or a fraction thereof, for use in the prevention of an infection in a subject, wherein the infection is selected from the group consisting of a protozoan parasitic infection and a bacterial infection, with the proviso that the infection is not caused by a *Mycobacterium*.

DESCRIPTION OF THE FIGURES

FIG. 1. Parasitemia percentage in treated and control Balb/c mice (n=3). *Statistically significant differences ($p<0.05$; Mann-Whitney U-test) between groups at the same time post-infection.

FIG. 2. Relative levels of *Plasmodium* 18S rRNA/Arbp0 in liver and blood from treated and control mice (n=3). Differences with controls were statistically significant (p<0.01 and *p<0.001; Mann-Whitney U-test).

Figure 3:
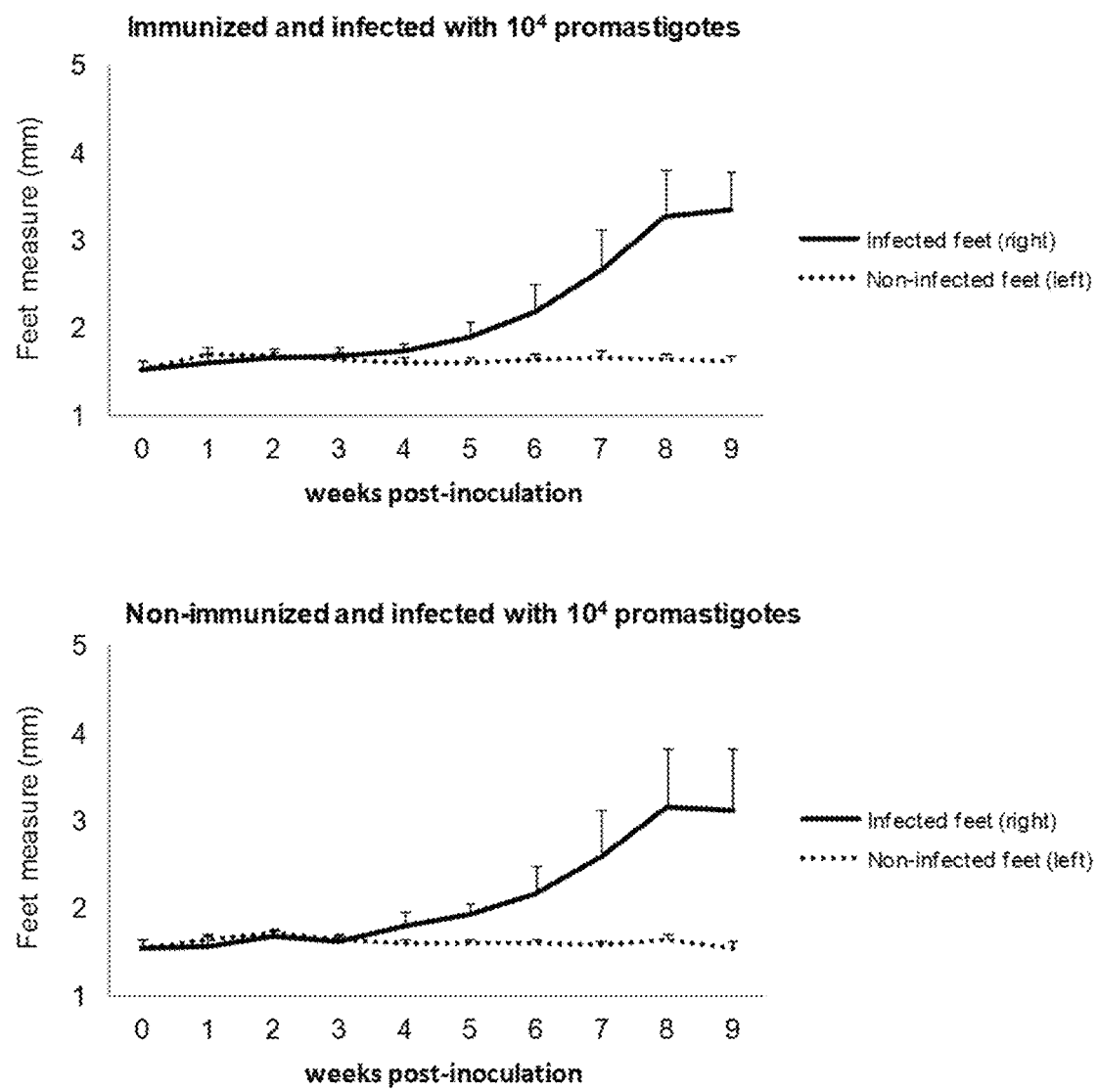

FIG. 3. Measurement of feet lesions. Mice were inoculated with $10^4$ promastigotes of *Leishmania amazonensis*. Lesion evolution was evaluated weekly.

Figure 4:
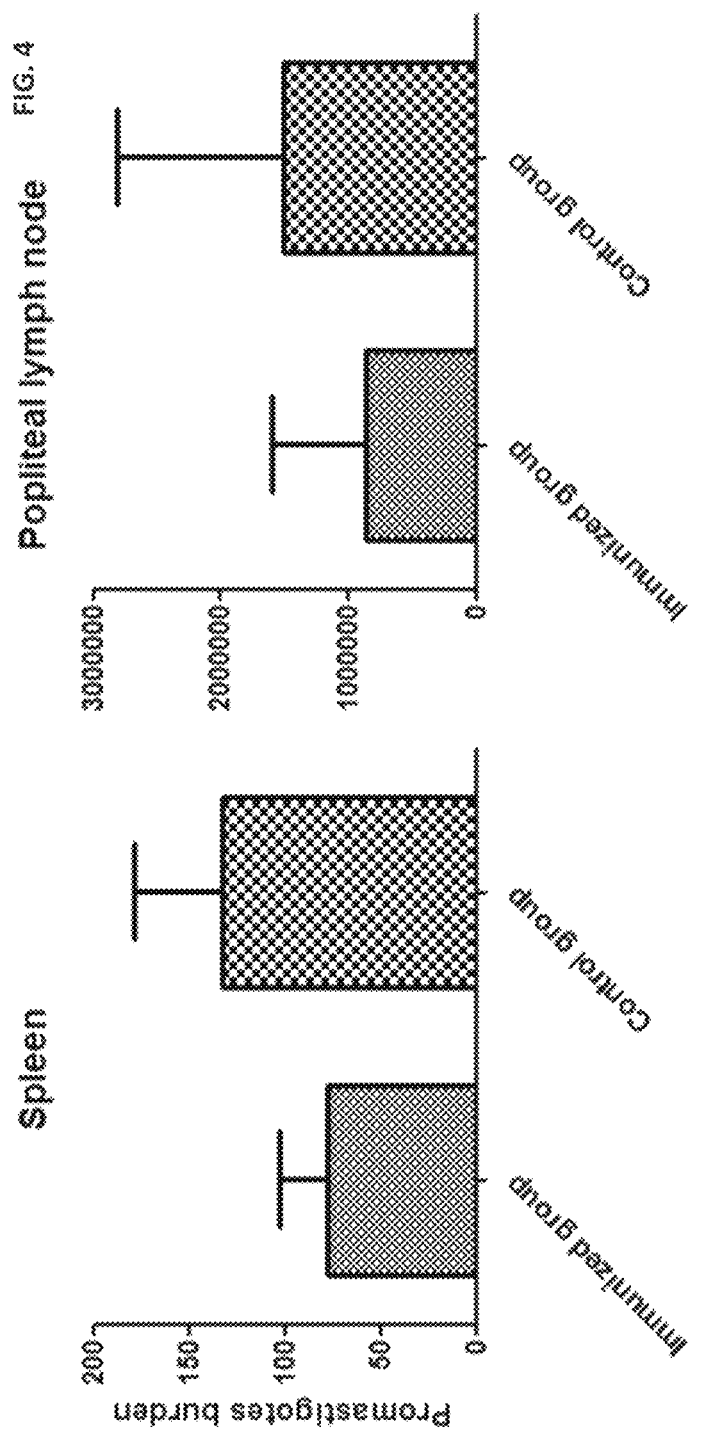

FIG. 4. Mean (±SEM) *Leishmania* burden determined by limiting dilutions in spleen and popliteal lymph node from mice inoculated with $10^4$ promastigotes of *Leishmania amazonensis*.

Figure 5:
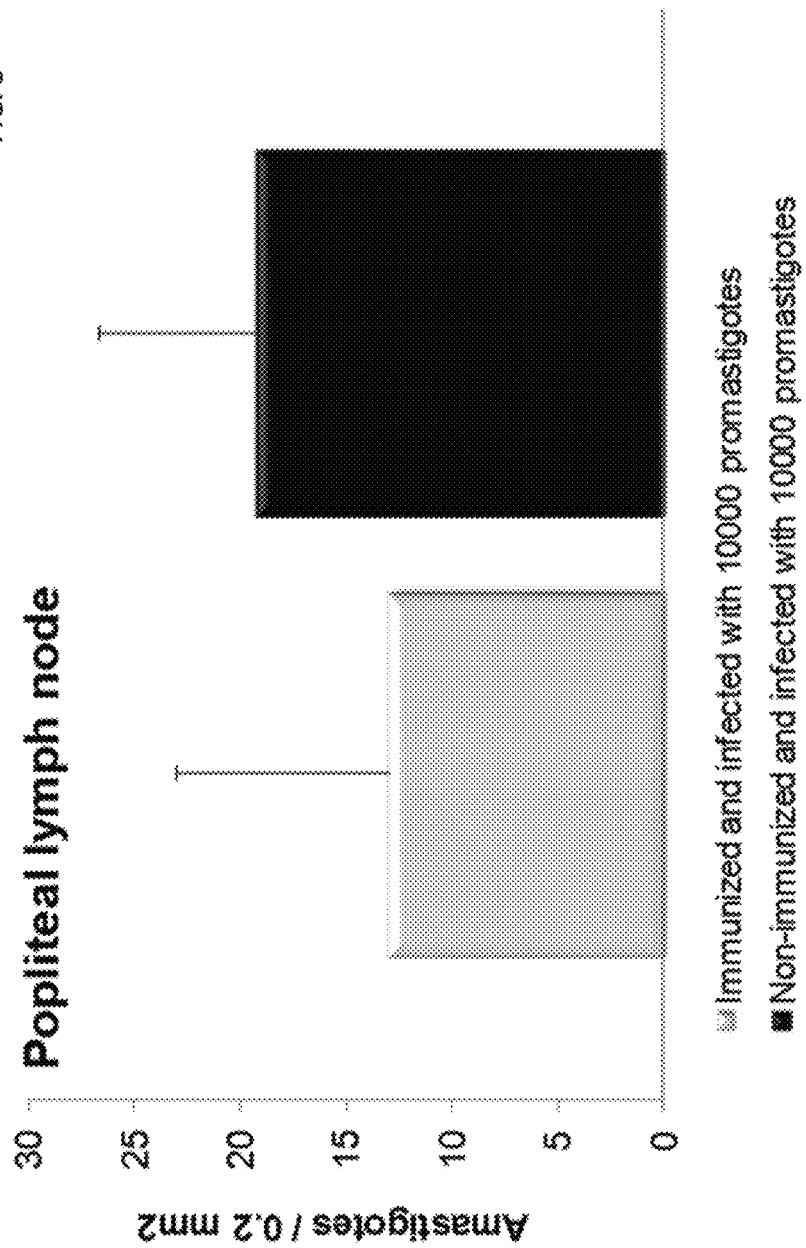

FIG. 5. Mean (±SD) number of amastigotes of *Leishmania* with positive immunolabelling by immunohistochemical methods in popliteal lymph node from mice inoculated with $10^4$ promastigotes of *Leishmania amazonensis* (light grey: Immunized group; dark grey: Control group). *Statistically significant differences (p<0.05; Mann-Whitney U-test) between groups.

Figure 6:
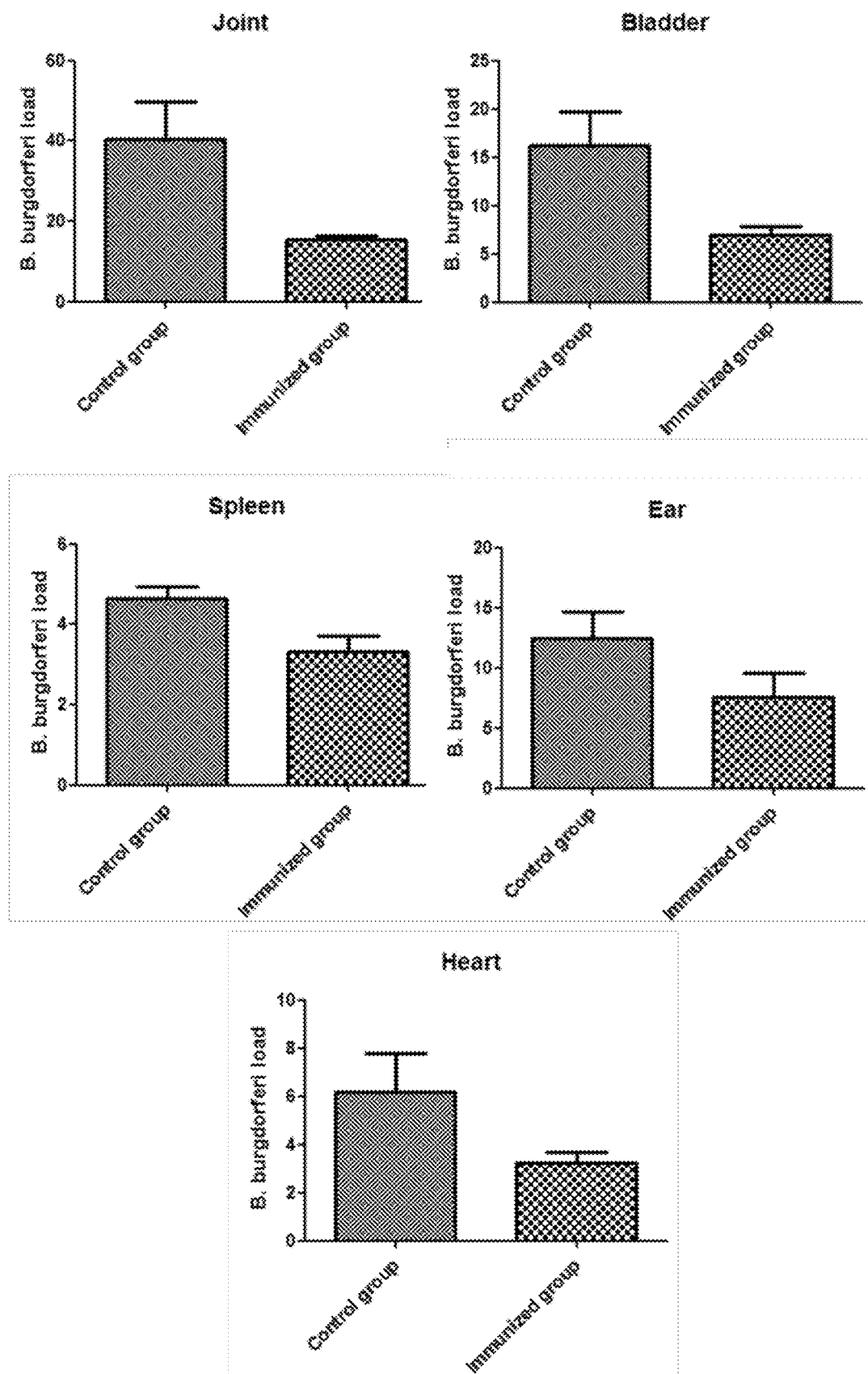

FIG. 6. Mean of *B. burgdorferi* load (±SEM) determined by PCR in joint, bladder, heart, spleen and ear from treated and control mice (n=3). Differences with controls were statistically significant (*p<0.05 and **p<0.01; Mann-Whitney U-test).

Figure 7:
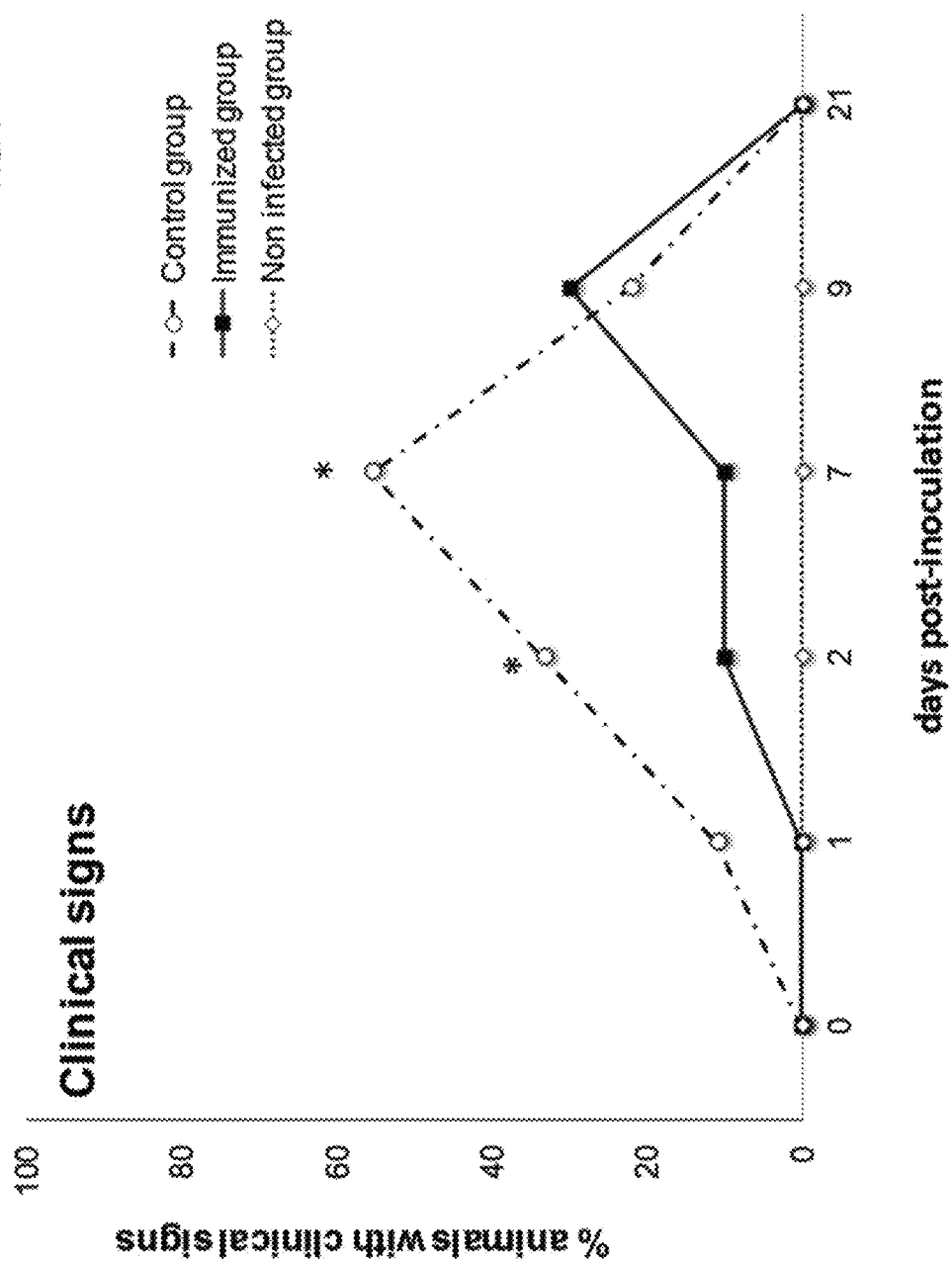

FIG. 7. Percentage of animals with clinical signs compatible with the challenge with $10^6$ CFU of *S. enterica* in pigs treated with inactivated *M. bovis* (treated group), infected but not treated (control group) and animals not treated or infected (non-infected group). *Statistically significant differences (p<0.05; Mann-Whitney U-test) between control group and treated group.

Figure 8:
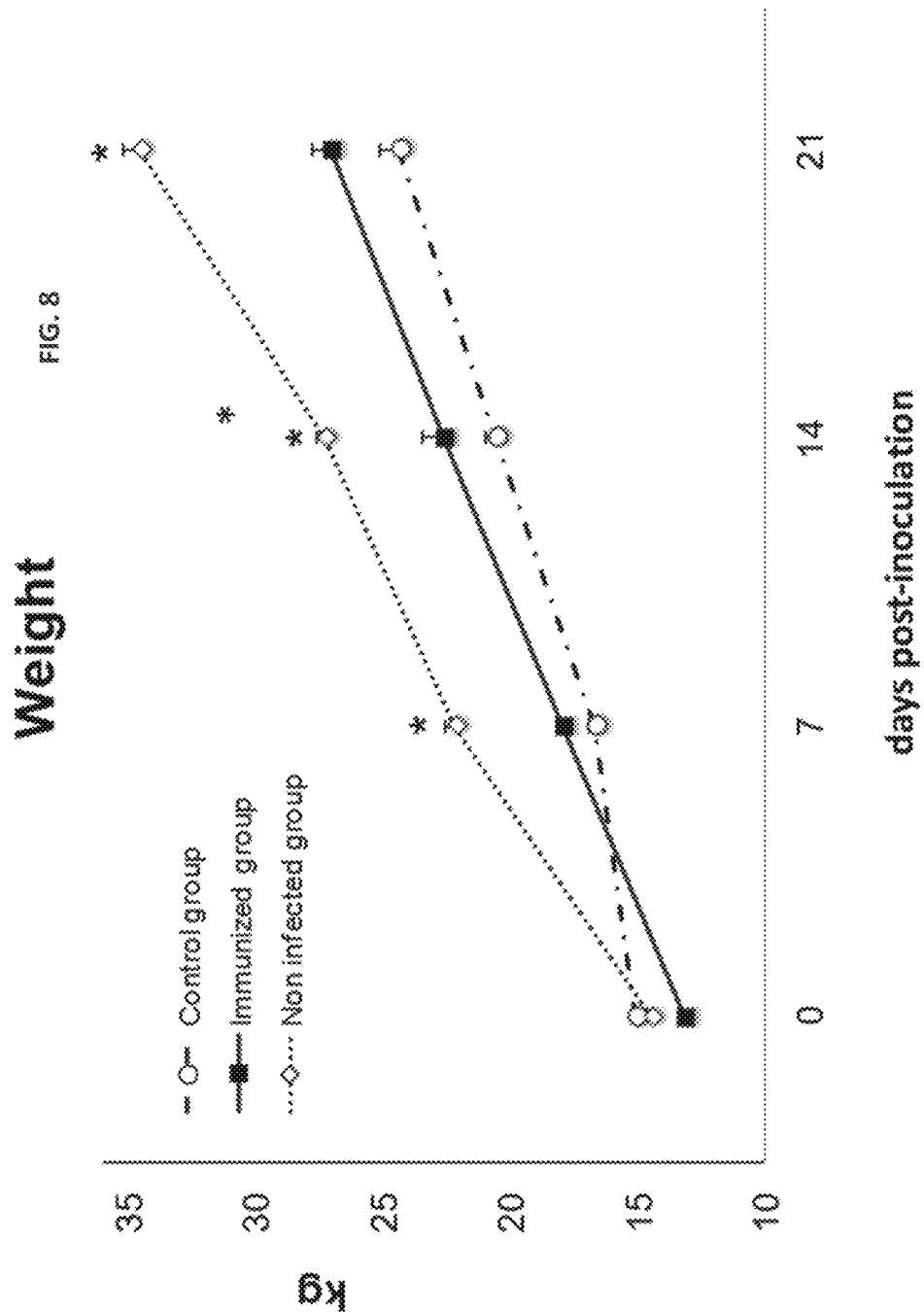

FIG. 8. Mean weight (±SEM) of the pigs treated with inactivated *M. bovis* (treated group) and infected but not treated (control group), both challenged with $10^6$ CFU of *S. enterica*, and animals not treated or infected (non-infected group). *Statistically significant differences (p<0.05; Mann-Whitney U-test) between control group and treated group.

Figure 9:
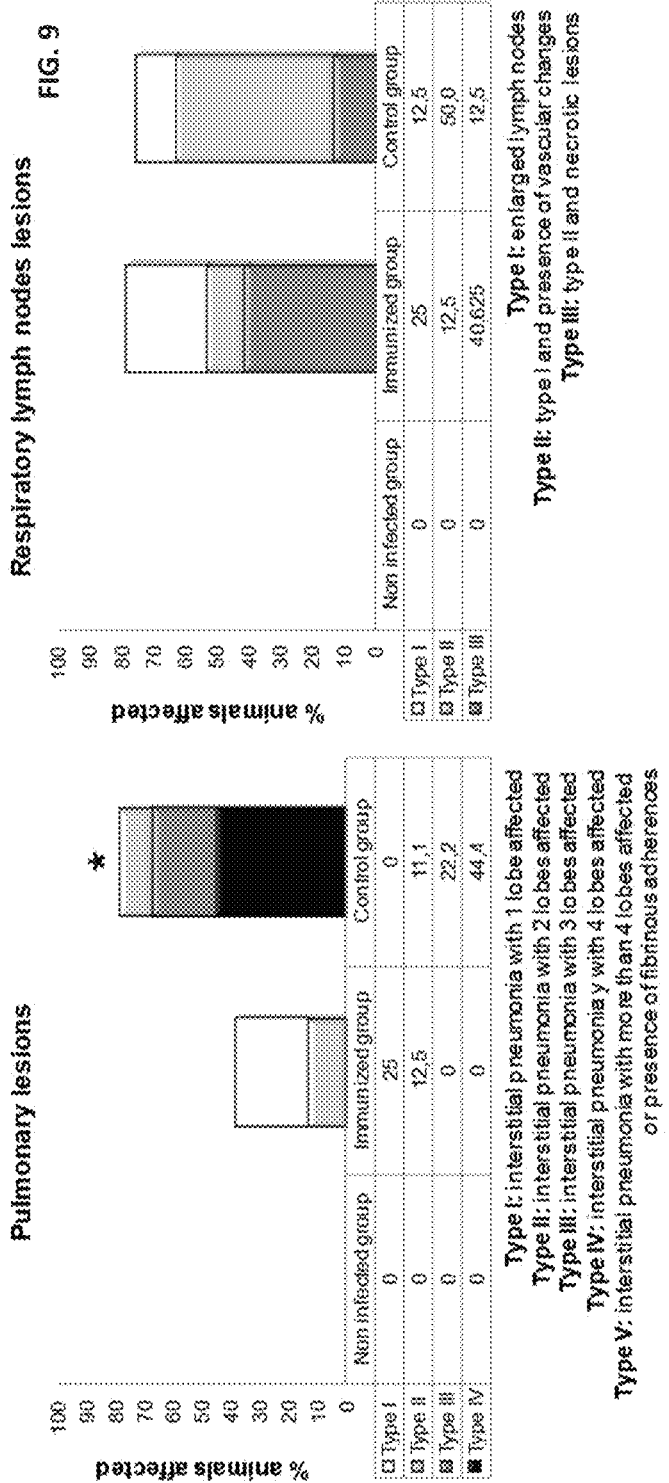
Figure 9:
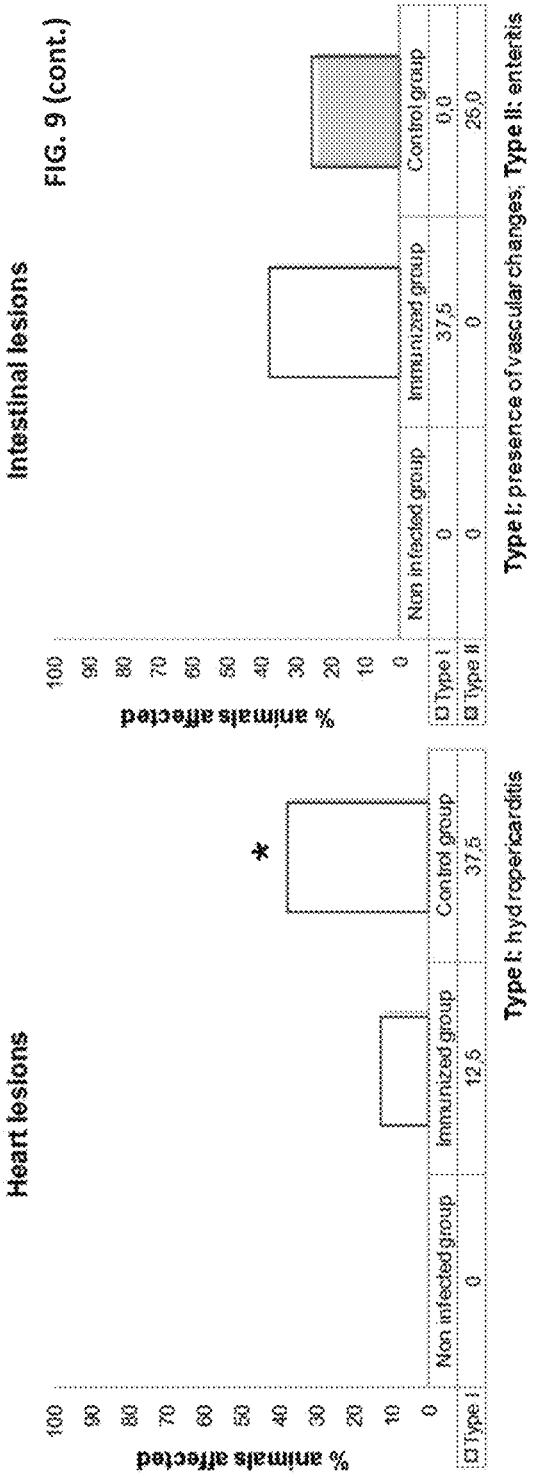

FIG. 9. Percentage of animals with different types of gross lesions compatible with *S. enterica* infection in several localizations in pigs treated with inactivated *M. bovis* (treated group), pigs infected but not treated (control group) and animals not treated or infected (non-infected group). *Statistically significant differences (p<0.05; Mann-Whitney U-test) between control group and treated group.

DETAILED DESCRIPTION OF THE INVENTION

In a first aspect the invention relates to a composition comprising an inactivated *Mycobacterium bovis* or a fraction thereof, for use in the prevention of an infection in a subject, wherein the infection is selected from the group consisting of a protozoan parasitic infection and a bacterial infection, with the proviso that the infection is not caused by a *Mycobacterium*.

In another aspect, the invention relates to the use of a composition comprising an inactivated *Mycobacterium bovis* or a fraction thereof for the manufacture of a medicament for the prevention of an infection in a subject, wherein the infection is selected from the group consisting of a protozoan parasitic infection and a bacterial infection, with the proviso that the infection is not caused by a *Mycobacterium*.

In another aspect, the invention relates to a method for the prevention of an infection in a subject, wherein the infection is selected from the group consisting of a protozoan parasitic infection and a bacterial infection with the proviso that the infection is not caused by a *Mycobacterium*, that comprises administering to a subject in need thereof a composition comprising an inactivated *Mycobacterium bovis* or a fraction thereof.

The term "*Mycobacterium*", as used herein, refers to a genus of acid fast bacteria of the Mycobacteriaceae family that cannot be stained by the gram stain procedure. The genus *Mycobacterium* is identified in the NCBI database by Taxonomy ID: 1763.

Within the context of the present invention, the *Mycobacterium* is selected from the group consisting of *M. africanum, M. bovis, M. canetti, M. caprae, M. microti, M. mungi, M. orygis, M. pinnipedii, M. suricattae, M. tuberculosis, M. avium, M. avium paratuberculosis, M. avium silvaticum, M. avium* "hominissuis", *M. colombiense, M. indicus pranii, M. intacellulare, M. smegmatis, M. phlei, M. fortuitum, M. lufu, M. paratuberculosis, M. habana, M. scrofulaceiu, M. gordonae, M. ulcerans. M. asiaticum, M. gastri, M. kansasii, M. hiberniae, M. icosiumassiliensis, M. nonchromogenicum, M. terrae, M. triviale, M. ulcerans, M. pseudoshottsii, M. shottsii, M. triplex, M. genavense, M. florentinum, M. lentiflavum, M. palustre, M. kubicae, M. parascrofulaceum, M. heidelbergense, M. interjectum, M. simiae, M. arabiense, M. aromaticivorans, M. aquaticum, M. bacteremicum, M. bohemicum, M. botniense, M. branderi, M. celatum, M. chimaera, M. conspicuum, M. cookie, M. doricum, M. farcinogenes, M. haemophilum, M. heckeshornense, M. lacus, M. leprae, M. lepraemurium, M. lepromatosis, M. liflandii, M. llatzerense, M. malmoense M. marinum, M. neoaurum, M. monacense, M. montefiorense, M. murale, M. nebraskense, M. saskatchewanense, M. sediminis, M. scrofulaceum, M. shimoidei, M. szulgai, M. talmoniae, M. tusciae, M. xenopi, M. yongonense, M. intermedium, M. abscessus, M. bolletii, M. chelonae, M. immunogenum, M. stephanolepidis, M. boenickei, M. brisbanense, M. cosmeticum, M. fortuitum* subsp. *Acetamidolyticum, M. houstonense, M. mageritense, M. neworleansense, M. peregrinum, M. porcinum, M. senegalense, M. septicum, M. aubagnese, M. mucogenicum, M. phocaicum, M. austroafricanum, M. diemhoferi, M. frederiksbergense, M. hodleri, M. neoaurum, M. parafortuitum, M. aurum, M. vaccae, M. chitae, M. fallax, M. agri, M. aichiense, M. alvei, M. arupense, M. barrassiae, M. brumae, M. canariasense, M. chubuense, M. conceptionense, M. confluentis, M. duvalii, M. elephantis, M. flavescens, M. gadium, M. gilvum, M. hassiacum, M. holsaticum, M. iranicum, M. komossense, M. madagascariense, M. massiliense, M. massilipolynesiensis, M. moriokaense, M. obuense, M. psychrotolerans, M. pulveris, M. pyrenivorans, M. goodie, M. wolinskyi, M. sphagni, M. thermoresistibile, M. vanbaalenii, M. arosiense, M. aubagnense, M. chlorophenolicum, M. fluoroanthenivorans, M. kumamotonense, M. novocastrense, M. parmense, M. poriferae, M. rhodesiae, M. seoulense M. tokaiense*, and combinations thereof.

In an embodiment, the *Mycobacterium* is selected from members of the *Mycobacterium tuberculosis* complex (MTBC) and combinations thereof. In the context of the present invention, the "*Mycobacterium tuberculosis* complex (MTBC)" is understood herein as a genetically related group of *Mycobacterium* species that can cause tuberculosis in a subject. It includes: *M. tuberculosis, M. africanum, M. orygis, M. bovis* (including the *Bacillus* Calmette-Guérin strain (BCG) of *M. bovis*), *M. microti, M. canetti, M. caprae, M. pinnipedii, M. suricattae* and *M. mungi*. In another embodiment, the *Mycobacterium* is selected from members of the *Mycobacterium avium* complex such as *M. avium, M. avium* paratuberculosis, *M. avium silvaticum, M. avium* "hominissuis", *M. colombiense, M. indicus* pranii, *M. inta-*

*cellulare* and combinations thereof. In yet another embodiment, the *Mycobacterium* is selected from the group consisting of *M. smegmatis, M. phlei, M. fortuitum, M. lufu, M. paratuberculosis, M. habana, M. scrofulaceiu, M. gordonae, M. ulcerans. M. asiaticum, M. gastri, M. kansasii, M. hiberniae, M. icosiumassiliensis, M. nonchromogenicum, M. terrae, M. triviale, M. ulcerans, M. pseudoshottsii, M. shottsii, M. triplex, M. genavense, M. florentinum, M. lentiflavum, M. palustre, M. kubicae, M. parascrofulaceum, M. heidelbergense, M. interjectum, M. simiae, M. arabiense, M. aromaticivorans, M. aquaticum, M. bacteremicum, M. bohemicum, M. botniense, M. branderi, M. celatum, M. chimaera, M. conspicuum, M. cookie, M. doricum, M. farcinogenes, M. haemophilum, M. heckeshornense, M. lacus, M. leprae, M. lepraemurium, M. lepromatosis, M. liflandii, M. llatzerense, M. malmoense M. marinum, M. neoaurum, M. monacense, M. montefiorense, M. murale, M. nebraskense, M. saskatchewanense, M. sediminis, M. scrofulaceum, M. shimoidei, M. szulgai, M. talmoniae, M. tusciae, M. xenopi, M. yongonense, M. intermedium, M. abscessus, M. bolletii, M. chelonae, M. immunogenum, M. stephanolepidis, M. boenickei, M. brisbanense, M. cosmeticum, M. fortuitum* subsp. *Acetamidolyticum, M. houstonense, M. mageritense, M. neworleansense, M. peregrinum, M. porcinum, M. senegalense, M. septicum, M. aubagnese, M. mucogenicum, M. phocaicum, M. austroafricanum, M. diemhoferi, M. frederiksbergense, M. hodleri, M. neoaurum, M. parafortuitum, M. aurum, M. vaccae, M. chitae, M. fallax, M. agri, M. aichiense, M. alvei, M. arupense, M. barrassiae, M. brumae, M. canariasense, M. chubuense, M. conceptionense, M. confluentis, M. duvalii, M. elephantis, M. flavescens, M. gadium, M. gilvum, M. hassiacum, M. holsaticum, M. iranicum, M. komossense, M. madagascariense, M. massiliense, M. massilipolynesiensis, M. moriokaense, M. obuense, M. psychrotolerans, M. pulveris, M. pyrenivorans, M. goodie, M. wolinskyi, M. sphagni, M. thermoresistibile, M. vanbaalenii, M. arosiense, M. aubagnense, M. chlorophenolicum, M. fluoroanthenivorans, M. kumamotonense, M. novocastrense, M. parmense, M. poriferae, M. rhodesiae, M. seoulense M. tokaiense*, and combinations thereof.

The *Mycobacterium* of the composition for use according to the first aspect of the invention is *M. bovis. M. bovis* is identified in the NCBI database by Taxonomy ID: 1765.

In a particular embodiment, the *Mycobacterium* is the *M. bovis* field isolate MB1, MB3 or MB4, whose genomic sequences have been deposited in the European Nucleotide Archive under the accession numbers CDHF01000001 to CDHF01000049; CDHH01000001 to CDHH01000094; or CDHE01000001 to CDHE01000118, respectively (de la Fuente et al., *Complete Genome Sequences of Field Isolates of Mycobacterium bovis and Mycobacterium caprae*, Genome Announc, May/June 2015 Vol. 3, Issue 3, e00247-15, and de la Fuente et al., *Comparative Genomics of Field Isolates of Mycobacterium bovis and M. caprae Provides Evidence for Possible Correlates with Bacterial Viability and Virulence*, PLoS Negl Trop Dis 9(11): e0004232). These isolates were originally obtained from wild boar (MB3, MB4) and cattle (MB1). The study focused on Ciudad Real province, Spain. This is a high ungulate density area, the west side of the province composed by interspersed game ranges and protected nature areal, with persistent TB infection in extensive livestock farms. In a particular embodiment, the *Mycobacterium* is an *M. bovis* classified within spoligotype SB0339, according to the notation of the *Mycobacterium bovis* Spoligotype Database (www.mbovis.org). In a particular embodiment, the genomic sequence of the *Mycobacterium* of the invention has a sequence homology of at least 70%, of at least 75%, of at least 80%, of at least 85%, of at least 90%, of at least 95%, of at least 96%, of at least 97%, of at least 98%, of at least 99% with the genomic sequence of *M. bovis* field isolate MB4. In a preferred embodiment, the *Mycobacterium* is the *M. bovis* field isolate MB1. In another preferred embodiment, the *Mycobacterium* is the *M. bovis* field isolate MB4.

In another particular embodiment, the *Mycobacterium* of the composition for use according to the invention is inactivated *M. bovis* BCG. In a preferred embodiment, the *Mycobacterium* is the *M. bovis* Danish reference strain (CCUG 27863).

As used herein, the term "inactivated" refers to a dead or inactivated cell of a microorganism which is no longer capable to form a single colony on a plate having medium specific for said microorganism, and it also encompasses lysates, fractions or extracts of the microorganism. The inactivation of a cell refers to a process of transforming a cell from viable to non-viable. The term "viable" or "viability", as used herein, refers to the ability of a cell to maintain itself or recover its potentialities and survive until they are able to divide. Thus, a cell that is viable indicates that the cell is able to survive and divide; conversely, a cell that is non-viable indicates that the cell is not able to survive and divide. It will be appreciated that non-viable cells include dead cells. Viability can be determined by a number of assays that are conventional in the art. These include cytolysis or membrane leakage assays, such as the lactate dehydrogenase assay, the propidium iodide assay, the trypan blue assay and the 7-aminoactinomycin D assay, as well as genomic and proteomic assays that test the activation of stress pathways using DNA microarrays and protein chips. Viability can also be determined by checking the absence of cells after their culture in an appropriate culture medium. Therefore, an inactivated *Mycobacterium* is different to an attenuated or live attenuated *Mycobacterium*, wherein the cells are alive and viable.

In an embodiment, the *Mycobacterium* of the composition for use according to the invention is inactivated through a process selected from the group consisting of microwave inactivation, pressure inactivation, acid inactivation, base inactivation, alcohol inactivation, peroxide inactivation, and thermal inactivation.

The term "microwave inactivation", as used herein, refers to the inactivation of cells using radio-frequency waves, which are usually used at a frequency of 2450 MHz. Typically, the microwaves produced by a "home-type" microwave oven (2.45 GHz) completely inactivate bacterial cultures, mycobacteria, viruses, and *G. stearothermophilus* spores within 60 seconds to 5 minutes depending on the challenge organism. For example, complete inactivation of *Mycobacterium bovis* was obtained with 4 minutes of microwave exposure (600 W, 2450 MHz) (Rosaspina S, Salvatorelli G, Anzanel D. *The bactericidal effect of microwaves on Mycobacterium bovis dried on scalpel blades*. J. Hosp. Infect. 1994; 26:45-50).

The term "pressure inactivation", as used herein, refers to the inactivation of cells using pressure. Methods suitable for pressure inactivation are well-known in the art and include, without limitation, homogenization, for example, using a homogenizer or a French press. For example, cell inactivation may be achieved using a high pressure homogenizer at a pressure of 1,500-2,000 bar and 15-20 pulses/min for 10 min.

The term "acid inactivation", as used herein, refers to the inactivation of cells by lowering the pH. This is normally achieved by adding an acid to the cells or the medium containing them and subsequently neutralizing the cells or the medium. Strong acids are preferred for the purposes of inactivating cells, and include, without limitation, hydrochloric acid (HCl), hydroiodic acid (HI), hydrobromic acid (HBr), perchloric acid (HClO$_4$), nitric acid (HNO$_3$), and sulfuric acid (H$_2$SO$_4$). The strength of an acid refers to its ability or tendency to lose a proton. For example, inactivation may be achieved by adding H$_2$SO$_4$ to the cells until a concentration of 80 mM is reached, incubating the cells at 55° C. for 4 h, and neutralizing by adding 10 M NaOH until the pH is 7.

Analogously, the term "base inactivation", as used herein, refers to the inactivation of cells using increasing the pH. This is normally achieved by adding a base to the cells or the medium containing them and subsequently neutralizing the cells or the medium. Strong bases are preferred for the purposes of inactivating cells, and include, without limitation, potassium hydroxide (KOH), barium hydroxide [Ba(OH)$_2$], cesium hydroxide (CsOH), sodium hydroxide (NaOH), strontium hydroxide [Sr(OH)$_2$], calcium hydroxide [Ca(OH)$_2$], lithium hydroxide (LiOH), and rubidium hydroxide (RbOH). The strength of a base refers to its ability to deprotonate an acid. For example, inactivation may be achieved by adding NaOH to the cells until a concentration of 80 mM is reached, incubating the cells at 55° C. for 4 h, and neutralizing by adding 96% H$_2$SO$_4$ until the pH is 7.

The term "alcohol inactivation", as used herein, refers to the inactivation of cells using alcohol. An alcohol is an organic hydroxyl compound with the —OH functional group bound to a saturated carbon atom, and includes ethanol, methanol, isopropanol, butanol; preferably ethanol. For example, cell inactivation may be achieved by making a 1:1 dilution of the cell culture with 96% ethanol, and incubating at 37° C. for 1 h. Subsequently, the ethanol is eliminated by evaporation in a rotary evaporator or rotavap.

The term "peroxide inactivation", as used herein, refers to the inactivation of cells using peroxide. A peroxide is a compound containing an oxygen-oxygen single bond or the peroxide anion, O$_2^{2-}$, and includes hydrogen peroxide (H$_2$O$_2$), superoxides, dioxygenyls, ozones and ozonides. For example, cell inactivation may be achieved by incubating the cells in 1.5% (v/v) H$_2$O$_2$ at 37° C. for 1 h. Subsequently, the H$_2$O$_2$ is eliminated by treating the cells with catalase.

The term "thermal inactivation" or "heat inactivation", as used herein, refers to the inactivation of cells using high temperatures. Usually, this is achieved by increasing the temperature of the cells or the medium containing them to over 50° C.

In a preferred embodiment, the *Mycobacterium* of the composition for use according to the invention is inactivated through thermal inactivation. Thermal inactivation can be achieved by different means, for example, without limitation, by incubation in a water bath or by autoclaving the *Mycobacterium*. In an even more preferred embodiment, the thermal inactivation process to inactivate the *Mycobacterium* of the composition for use according to the invention comprises heating the *Mycobacterium* at a temperature between 50° C. and 150° C., between 60° C. and 120° C., between 65° C. and 100° C., between 70° C. and 90° C., between 75° C. and 85° C., and more preferably between 80° C. and 85° C. for a period between 15 minutes and 90 minutes, between 20 minutes and 60 minutes, between 25 and 50 minutes, between 30 and 45 minutes; more preferably in a water bath. In a preferred embodiment, the thermal treatment is applied during a period of 45 minutes, 40 minutes, 35 minutes and more preferably during 30 minutes. In a more preferred embodiment the thermal inactivation process comprises heating the *Mycobacterium* in a water bath at a temperature between 80° C. and 85° C. for a period between 30 minutes and 45 minutes.

In a preferred embodiment, the composition comprises inactivated cells of *Mycobacterium*, preferably whole cells. In another embodiment, the composition comprises cell lysates of *Mycobacterium*.

In the context of the present invention, the term "fraction" refers to a part of the *Mycobacterium* that retains its immunogenicity after the inactivation process, i.e. it is an immunogenic fraction. In a particular embodiment, the immunogenic fraction is selected from the group consisting of: a residue from the treatment of the *Mycobacterium* strain with a glycosidase (deglycosylated residue); a residue from the digestion of the *Mycobacterium* strain by a DNase and/or a RNase; a residue from the treatment of the *Mycobacterium* strain with a protease; a residue from the treatment of the *Mycobacterium* strain with successively, a glycosidase, a DNase and/or a RNase, and finally a protease; and a residue from the treatment of said *Mycobacterium* strain with a protease (as substilisine for example) and a DNase.

As used herein, the terms "prevention", "preventing", "preventive" and "prevent", refer to the capacity of a given substance, composition or medicament to avoid, minimize or difficult the onset or development of an infection. The term "preventive treatment", as used herein, refers to any type of therapy, which is aimed at preventing or reducing the susceptibility to a clinical condition as described herein. In a preferred embodiment, the term treatment relates to prophylactic treatment (i.e. a therapy to reduce the susceptibility to a clinical condition), of a disorder or a condition as defined herein. Thus, "treatment," "treating," and their equivalent terms refer to obtaining a desired pharmacologic or physiologic effect, covering any prophylactic treatment of a pathological condition in terms of completely or partially preventing a disorder or symptom thereof.

The compositions of the invention are used for the prevention of an infectious disease. An infectious disease is caused by the infection of an agent.

The term "infection", as used herein, relates to invasion by bacteria, protozoa or other microorganisms, referring to the undesired proliferation or presence of invasion of pathogenic microbes in a host organism. It includes the excessive growth of microbes that are normally present in or on the body of a vertebrate or other organism. More generally, a microbial infection can be any situation in which the presence of a microbial population(s) is damaging to a host vertebrate. Thus, a microbial infection exists when excessive numbers of a microbial population are present in or on a vertebrate's body, or when the effects of the presence of a microbial population(s) is damaging the cells or other tissue of a vertebrate.

The composition of the invention has particular utility in preventing diseases caused by pathogens. It is contemplated that the composition described herein will be useful in preventing diseases of mammals, for example, farm animals including: cattle; horses; goats; sheep; and pigs, and household pets including: cats; and dogs, as well as wild animals like apes, monkey, rat, mouse, rabbit and boar. The composition of the invention may also be used in preventing human diseases caused by pathogens. The composition of the invention is also useful for use in vertebrates such as fish, birds and reptiles. Therefore the term "subject" in the context of the present invention refers to any vertebrate including, without limitation, fish, birds, reptiles, mammals such as cattle, horses, goats, sheep, pigs, cats, dogs, apes, monkeys, rats, mice, rabbits, boars and humans. In a preferred embodiment, the vertebrate is a mammal, more preferably an adult.

The infection to be prevented in the context of the present invention is not caused by a *Mycobacterium*. Diseases associated with a *Mycobacterium* infection, as used herein, refer to any disease resulting from the infection by any mycobacteria, including tuberculosis. The term "tuberculosis" comprises infections due to *Mycobacterium tuberculosis* and/or *Mycobacterium bovis*; respiratory tuberculosis such as tuberculosis of lung, larynx, trachea and bronchus, tuberculosis of intrathoracic lymph nodes, tuberculous pleurisy, primary respiratory tuberculosis and other respiratory tuberculosis; tuberculosis of the nervous system such as tuberculous meningitis, tuberculosis of meninges, tuberculous leptomeningitis, meningeal tuberculoma and other tuberculosis of the nervous system; tuberculosis of bones and joints, tuberculosis of genitourinary system, tuberculous peripheral lymphadenopathy, tuberculosis of intestines, peritoneum and mesenteric glands, tuberculosis of skin and subcutaneous tissue, tuberculosis of eye, ear, or adrenal glands, and miliary tuberculosis (International Classification of Diseases, 10th Revision, Blocks A15-A19).

In a particular embodiment, the infection to be prevented with the composition of the invention is selected from the group consisting of a protozoan parasitic infection and a bacterial infection. The term "protozoan" refers to single-celled eukaryotes, either free-living or parasitic, which feed by heterotrophy on organic matter such as other microorganisms or organic tissues and debris. Protozoan parasitic organisms are capable of invading, colonizing and, under appropriate conditions, causing disease in an animal. Examples of protozoan parasites include *Leishmania donovani*, *Plasmodium falciparum*, *Giardia lamblia*, *Trypanosoma gambiense* and *Trypanosoma cruzi*. See generally, Robbins et al., Pathologic Basis of Disease (Saunders, 1984) 273-75, 360-83. The terms "bacterium", "bacteria" or "bacterial infection" refer to both gram-negative and gram-positive bacterial cells capable of infecting and causing disease in a host, as well as producing infection-related symptoms in the infected host, such as fever or other signs of inflammation, intestinal symptoms, respiratory symptoms, dehydration, and the like. In one embodiment the bacteria are gram-negative bacteria. In another embodiment the bacteria are gram-positive bacteria. In another embodiment the bacteria are gram-positive bacteria together with gram-negative bacteria. In another embodiment there is only one bacteria specie infecting or causing disease. In yet another embodiment there is different bacteria species from one bacteria genus, infecting or causing disease. In still another embodiment there is different bacteria species from different bacteria genus, infecting or causing disease.

In a particular embodiment the protozoan parasitic infection is caused by a protozoan from the genus selected from the group consisting of *Acanthamoeba*, *Babesia*, *Balamuthia*, *Balantidium*, *Blastocystis*, *Cryptosporidium*, *Cyclospora*, *Dientamoeba*, *Entamoeba*, *Giardia*, *Isospora*, *Leishmania*, *Naegleria*, *Plasmodium*, *Rhinosporidium*, *Sarcocystis*, *Toxoplasma*, *Trichomonas*, *Trypanosoma* and combinations thereof. In another particular embodiment the infection is a bacterial infection caused by a bacterium from the genus selected from the group consisting of *Acinetobacter*, *Actinobacillus*, *Aeromonas*, *Aggregatibacter*, *Agrobacterium*, *Anaplasma*, *Bacillus*, *Bordetella*, *Borrelia*, *Brucella*, *Burkholderia*, *Campylobacter*, *Chlamydia*, *Chromobacterium*, *Clostridium*, *Corynebacterium*, *Cyanobacteria*, *Enterobacter*, *Enterococcus*, *Erwinia*, *Escherichia*, *Francisella*, *Fusobacterium*, *Haemophilus*, *Helicobacter*, *Klebsiella*, *Lactobacillus*, *Legionella*, *Listeria*, *Micrococcus*, *Moraxella*, *Mycoplasma*, *Neisseria*, *Nitrosomas*, *Nocardia*, *Obesumbacterium*, *Pantoea*, *Pasteurella*, *Pediococcus*, *Porphyromonas*, *Prevotella*, *Proteus*, *Pseudomonas*, *Ralstonia*, *Rickettsia*, *Rhisobium*, *Rhodobacter*, *Salmonella*, *Serratia*, *Shigella*, *Staphyllococcus*, *Streptococcus*, *Tannerella*, *Treponema*, *Tsukamurella*, *Vibrio*, *Xenorhabdus*, *Yersinia* and combinations thereof.

In a preferred embodiment the protozoan parasitic infection or the bacterial infection is caused by protozoa from the genus *Leishmania* or *Plasmodium*, or by bacteria from the genus *Borrelia* or *Salmonella*.

Parasites of the genus *Leishmania* are responsible for the disease leishmaniasis. They are spread by sandflies of the genus *Phlebotomus* and *Lutzomyia* and their primary hosts are vertebrates; *Leishmania* commonly infects hyraxes, canids, rodents, and humans and causes disease affecting the skin, mucosa or viscera. The genus *Leishmania* includes 53 species, 20 of them infect humans. The genus *Leishmania* is identified in the NCBI database by Taxonomy ID: 5658. Non limiting examples of *Leishmania* species are: *L. aethiopica*, *L. amazonensis*, *L. arabica*, *L. archibaldi*, *L. aristedesi*, *L. chagasi*, *L. donovani*, *L. enriettii*, *L. forattinii*, *L. gerbilli*, *L. hertigi*, *L. infantum*, *L. killicki*, *L. major*, *L. mexicana*, *L. siamensis*, *L. tropica*, *L. turanica*, *L. adleri*, *L. agamae*, *L. ceramodactyli*, *L. deanei*, *L. gamhami*, *L. gulikae*, *L. gymnodactyli*, *L. hemidactyli*, *L. herreri*, *L. hoogstraali*, *L. nicollei*, *L. senegalensis*, *L. tarentolae*, *L. braziliensis*, *L. colombiensis*, *L. equatorensis*, *L. guyanensis*, *L. lainsoni*, *L. naiffi*, *L. panamensis*, *L. peruviana*, *L. pifanoi*, *L. shawi*, *L. utingensis*, *L. venezuelensis*, *L. enrittii complex*, *L. enrittii*, *L. martiniquensis*. In a preferred embodiment the *Leishmania* is *L. amazonensis* (NCBI:Taxonomy ID:5659).

The genus *Plasmodium* refers herein to a genus of unicellular parasites, many of which cause malaria in their hosts. The genus *Plasmodium* is identified in the NCBI database by Taxonomy ID: 5820. *Plasmodium* parasites can infect a broad array of vertebrate hosts including reptiles, birds and mammals. Non-limiting examples of *Plasmodium* species that can cause diseases in vertebrates are: *P. accipiteris*, *P. achiotense*, *P. achromaticum*, *P. acuminatum*, *P. adunyinkai*, *P. aegyptensis*, *P. aeuminatum*, *P. agamae*, *P. alloelongatum*, *P. anasum*, *P. anomaluri*, *P. arachniformis*, *P. ashfordi*, *P. atheruri*, *P. audaciosum*, *P. aurulentum*, *P. australis*, *P. attenuatum*, *P. azurophilum*, *P. balli*, *P. bambusicolai*, *P. basilisci*, *P. beebei*, *P. beltrani*, *P. berghei*, *P. bertii*, *P. bigueti*, *P. bitis*, *P. biziurae*, *P. booliati*, *P. bouillize*, *P. bowiei*, *P. brodeni*, *P. brasilianum*, *P. brasiliense*, *P. brumpti*, *P. brucei*, *P. brygooi*, *P. bubalis*, *P. bucki*, *P. bufoni*, *P. buteonis*, *P. capistrani*, *P. carinii*, *P. cathemerium*, *P. causi*, *P. cephalophi*, *P. cercopitheci*, *P. chabaudi*, *P. chalcidi*, *P. chiricahuae*, *P. circularis*, *P. circumflexum*, *P. clelandi*, *P. cordyli*, *P. cnemaspi*, *P. cnemidophori*, *P. coatneyi*, *P. coggeshalli*, *P. colombiense*, *P. columbae*, *P. corradettii*, *P. cotumixi*, *P. coulangesi*, *P. cuculus*, *P. cyclopsi*, *P. cynomolgi*, *P. diminutivum*, *P. diploglossi*, *P. dissanaikei*, *P. divergens*, *P. dominicana*, *P. draconis*, *P. durae*, *P. effusum*, *P. egerniae*, *P. elongatum*, *P. eylesi*, *P. fabesia*, *P. fairchildi*, *P. falciparum*, *P. falconi*, *P. fallax*, *P. fieldi*, *P. fischeri*, *P. foleyi*, *P. formosanum*, *P. forresteri*, *P. floridense*, *P. fragile*, *P. galbadoni*, *P. gamhami*, *P. gallinaceum*, *P. gemini*, *P. georgesi*, *P. giganteum*, *P. giganteumaustralis*, *P. giovannolai*, *P. Girardi*, *P. gonderi*, *P. globularis*, *P. gologoense*, *P. gonatodi*, *P. gracilis*, *P. griffithsi*, *P. Guangdong*, *P. gundersi*, *P. guyannense*, *P. heischi*, *P. hegneri*, *P. hermani*, *P. herodiadis*, *P. heteronucleare*, *P. hexamerium*, *P. holaspi*, *P. holti*,

*P. huffi, P. hylobatid, P. incertae, P. icipeensis, P. iguana, P. inconstans, P. inopinatum, P. inui, P. japonicum, P. jefferi, P. jiangi, P. josephinae, P. joyeuxi, P. juxtanucleare, P. kempi, P. kentropyxi, P. knowlesi, P. koreafense, P. lacertiliae, P. lagopi, P. lainsoni, P. landauae, P. leanucteus, P. lemuris, P. lepidoptiformis, P. limnotragi, P. lionatum, P. lophurae, P. loveridgei, P. lutzi, P. lygosomae, P. mabuiae, P. mackerrasae, P. mackiei, P. maculilabre, P. maior, P. majus, P. malariae, P. marginatum, P. matutinum, P. megaglobularis, P. megalotrypa, P. melanoleuca, P. melanipherum, P. mexicanum, P. michikoa, P. minasense, P. minuoviride, P. modestum, P. morulum, P. multiformis, P. murinus, P. narayani, P. necatrix, P. neotropicalis, P. neusticuri, P. nucleophilium, P. octamerium, P. odocoilei, P. osmaniae, P. ovale, P. paddae, P. papernai, P. paranucleophilum, P. parvulum, P. pedioecetii, P. pelaezi, P. percygamhami, P. pessoai, P. petersi, P. pifanoi, P. pinotti, P. pinorrii, P. pitheci, P. pitmani, P. polare, P. pulmophilum, P. pythonias, P. quelea, P. reichenowi, P. relictum, P. rhadinurum, P. rhodaini, P. robinsoni, P. rousetti, P. rousseloti, P. rouxi, P. sandoshami, P. sasai, P. saurocaudatum, P. schweitzi, P. scelopori, P. scorzai, P. semiovale, P. semnopitheci, P. shortii, P. siamense, P. silvaticum, P. simium, P. simplex, P. smimovi, P. stuthionis, P. tanzaniae, P. tenue, P. tejerai, P. telfordi, P. tomodoni, P. torrealbai, P. toucan, P. traguli, P. tribolonoti, P. tropiduri, P. tumbayaensis, P. tyrio, P. uilenbergi, P. uluguruense, P. uncinatum, P. uranoscodoni, P. utingensis, P. uzungwiense, P. watteni, P. wenyoni, P. vacuolatum, P. vastator, P. vaughani, P. vautieri, P. venkataramiahii, P. vinckei, P. vivax, P. Volans, P. voltaicum, P. wenyoni, P. yoelii, P. youngi, P. zonuriae.* In a preferred embodiment, the *Plasmodium* is selected from the group consisting of *P. berghei, P. falciparum, P. vivax, P. ovale, P. malariae* and *P. knowlesi*. In another embodiment the *P. ovale* is selected from *P. ovale curtisi* and *P. ovale wallikeri*. In a more preferred embodiment the *Plasmodium* is *P. berghei* (NCBI: Taxonomy ID: 5821), even more preferably *P. berghei* ANKA (NCBI:Taxonomy ID: 5823). As used herein, the term *Borrelia* makes reference to a genus of bacteria of the spirochete phylum. The genus *Borrelia* is identified in the NCBI database by Taxonomy ID: 138. It causes borreliosis, a zoonotic, vector-borne disease transmitted primarily by ticks and by lice, depending on the species. Examples of species of the genus *Borrelia* include without limitation: *B. afzelii, B. americana, B. andersonii, B. anserina, B. baltazardii, B. bavariensis, B. bissettii, B. brasiliensis, B. burgdorferi, B. californiensis, B. carolinensis, B. caucasica, B. coriaceae, B. crocidurae, B. dugesii, B. duttonii, B. garinii, B. graingeri, B. harveyi, B. hermsii, B. hispanica, B. japonica, B. kurtenbachii, B. latyschewii, B. lonestari, B. lusitaniae, B. mazzottii, B. merionesi, B. microti, B. miyamotoi, B. parkeri, B. persica, B. queenslandica, B. recurrentis, B. sinica, B. spielmanii, B. tanukii, B. theileri, B. tillae, B. turcica, B. turdi Fukunaga, B. turicatae, B. valaisiana, B. venezuelensis* and *B. vincentii.* In a preferred embodiment the *Borrelia* is *B. burgdorferi* (NCBI:Taxonomy ID: 139).

The term *Salmonella* as used in the present invention makes reference to rod-shaped (*Bacillus*) gram-negative bacteria of the family Enterobacteriaceae. The genus *Salmonella* is identified in the NCBI database by Taxonomy ID: 590. It comprises *Salmonella bongori* and *Salmonella enterica* as well as subspecies from *Salmonella enterica* such as: *S. enterica enterica, S. enterica salamae, S. enterica arizonae, S. enterica diarizonae, S. enterica houtenae,* and *S. enterica indica*. It also includes serotypes like *Salmonella enterica* subsp. *enterica* serotype *typhimurium* (abbreviated to *Salmonella typhimurium*). Examples of *Salmonella* serotypes include without limitation: *S. paratyphi* A, *S. paratyphi* A var. *durazzo, S. paratyphi* B, *S. paratyphi* B var. *odense, S. java, S. limete, S. typhimurium, S. typhimurium* var. *copenhagen, S. agama, S. abortus-equi, S. abortus-ovis, S. agona, S. brandenburg, S. bredeney, S. derby, S. heidelberg, S. saintpaul, S. salinatis, S. stanley, S. paratyphi* C, *S. choleraesuis, S. choleraesuis* var. *kunzendorf, S. decatur, S. typhisuis, S. bareilly, S. infantis, S. menston, S. montevideo, S. oranienburg, S. thompson, S. bovismorbificans, S. newport, S. Typhi, S. ndolo, S. dublin, S. enteritidis, S. gallinarum, S. pullorum, S. panama, S. miami, S. sendai, S. anatum, S. give, S. london, S. meleagridis, S. cambridge, S. newington, S. minneapolis, S. senftenberg, S. simsbury, S. aberdeen, S. cubana, S. poona, S. heves, S. onderstepoort, S. brazil, S. hvittingfoss, S. kirkee, S. adelaide* and *S. locarno.* In a preferred embodiment, *Salmonella* is selected from the group consisting of *Salmonella enterica* and *Salmonella typhimurium*; more preferably *Salmonella enterica* (NCBI: Taxonomy ID: 28901).

In another particular embodiment the protozoan parasitic infection is caused by a protozoan selected from the group consisting of *Acanthamoeba* spp., *Balamuthia mandrillaris, Babesia divergens, Balantidium coli, Blastocystis* spp., *Cryptosporidium* spp., *Cyclospora cayetanensis, Dientamoeba fragilis, Entamoeba histolytica, Giardia lamblia, Isospora belli, Leishmania* spp., *Naegleria fowleri, Plasmodium berghei, Plasmodium falciparum, Plasmodium vivax, Plasmodium ovale, Plasmodium malariae, Plasmodium knowlesi, Rhinosporidium seeberi, Sarcocystis bovihominis, Sarcocystis suihominis, Toxoplasma Trichomonas vaginalis, Trypanosoma brucei* and *Trypanosoma cruzi.*

In another particular embodiment, the bacterial infection to be treated with the composition of the invention is caused by a bacteria selected from the group consisting of *Aeromonas hydrophila, Aeromonas salmonicida, Acinetobacter baumannii, Aggregatibacter actinomycetemcomitans, Agrobacterium tumefaciens, Anaplasma* spp., *Bacillus anthracis, Bacillus cereus, Bacillus subtilis, Borrelia burgdorferi, Bordetella pertussis, Brucella abortus, Burkholderia cepacia, Campylobacter jejuni, Chlamydia trachomatis, Chromobacterium violaceum, Clostridium botulinum, Clostridium tetani, Corynebacterium diphtheria, Enterobacter agglomeran, Enterococcus faecalis, Erwinia carotovora, Erwinia chrysanthemi, Escherichia coli, Francisella tularensis, Fusobacterium nucleatum, Haemophilus influenzae, Helicobacter pylori, Lactobacillus Plantarum, Legionella pneumophila, Listeria monocytogenes, Klebsiella Pneumoniae, Mycoplasma pneumoniae, Micrococcus Luteus, Neisseria meningitidis, Neisseria gonorrhoeae, Nitrosomas europaea, Nocardia carnea, Obesumbacterium proteus, Pantoea stewartii, Pediococcus acidilactici, Prevotella intermedia, Porphyromonas gingivalis, Pseudomonas aureofaciens, Pseudomonas aeruginosa, Pseudomonas phosphoreum, Pseudomonas syringae, Ralstonia solanacearum, Rhisobium etli, Rhisobium leguminosarum, Rhodobacter sphaeroides, Rickettsia* spp., *Salmonella enterica, Salmonella typhimurium, Serratia liguefaciens, Serratia marcescens, Shigella sonnei, Staphylococcus aureus, Staphylococcus epidermidis, Staphylococcus enteritis, Streptococcus pneumoniae, Tannerella forsythensis, Treponema denticola, Treponema pallidum, Tsukamurella pulmonis, Vibrio anguillarum, Vibrio fischeri, Vibrio cholerae, Vibrio harveyi, Vibrio parahaemolyticus, Vibrio alginolyticus, Vibrio vulnificus, Xenorhabdus nematophilus, Yersinia entero-*

*colitica, Yersinia pestis, Yersinia pseudotuberculosis, Yersinia medievalis, Yersinia ruckeri* and combinations thereof.

In an even more preferred embodiment the infection is caused by the protozoa *Leishmania amazonensis* or *Plasmodium berghei*, or by the bacteria *Borrelia burgdorferi* or *Salmonella enterica*. In an embodiment, the infection is caused by the protozoa *Plasmodium berghei*, preferably the *Plasmodium berghei* ANKA strain.

The composition for use according to the invention can be administered by any route, including topical (local), enteral (system-wide effect, but delivered through the gastrointestinal tract), or parenteral (systemic action, but delivered by routes other than the gastrointestinal tract). Examples include, without limitation, oral, sublingual, intravenous, intranasal, intraperitoneal, mucosal, intrapulmonary, enteral, parenteral, topical, rectal route or combinations thereof. A person skilled in the art would select an appropriate administration route for the composition of the present invention. A review of the different forms for the administration of active ingredients can be found in Tratado de Farmacia Galenica, C. Fauli i Trillo, Luzan 5, S. A. de Ediciones, 1993 and in Remington's Pharmaceutical Sciences (A. R. Gennaro, Ed.), 20th edition, Williams & Wilkins PA, USA (2000).

In a preferred embodiment, the composition for use according the invention is administered by oral, sublingual, intranasal, mucosal, intrapulmonary, parenteral route or combinations thereof. In an even more preferred embodiment, the composition for use according to the invention is administered by oral and/or parenteral route. In an embodiment the composition is administered by oral route. In another embodiment, the composition is administered by parenteral route, preferably by a parenteral route selected from the group consisting of intravenous, intramuscular, subcutaneous and intradermal route.

The composition for use according to the invention can be formulated to be administered by oral, sublingual, intranasal, intramuscular, subcutaneous, mucosal, intrapulmonary, intravenous, intradermal route, or combinations thereof.

The formulations of the invention may be produced following methods known in the art (see "Remington, the Science and practice of pharmacy", 21st Edition, 2005, Ed. Lippincott Williams & Wilkins). By way of example, the pharmaceutical composition of the present invention may be formulated to be delivered using a mini-pump or by a mucosal route, for example, as a nasal spray or aerosol for inhalation or ingestable solution, or parenterally in which the composition is formulated by an injectable form, for delivery, by, for example, an intravenous, intramuscular, intradermal or subcutaneous route. In a preferred embodiment, the formulation is of injectable form. More preferably the formulation is intradermally injected. In another preferred embodiment, the formulation is an orally acceptable composition. Where the agent is to be delivered mucosally through the gastrointestinal mucosa, it should be able to remain stable during transit through the gastrointestinal tract; for example, it should be resistant to proteolytic degradation, stable at acid pH and resistant to the detergent effects of bile.

Where appropriate, the compositions can be administered by inhalation, in the form of a suppository or pessary, topically in the form of a lotion, solution, cream, ointment or dusting powder, by use of a skin patch, orally in the form of tablets containing excipients such as starch or lactose, or in capsules or ovules either alone or in admixture with excipients, or in the form of elixirs, solutions or suspensions containing flavoring or coloring agents, or they can be injected parenterally, for example intravenously, intramuscularly, intradermally or subcutaneously. For parenteral administration, the compositions may be best used in the form of a sterile aqueous solution which may contain other substances, for example enough salts or monosaccharides to make the solution isotonic with blood. For buccal or sublingual administration the compositions may be administered in the form of tablets or lozenges which can be formulated in a conventional manner.

In a particular embodiment, the composition for use according to the invention contains between $1 \times 10^2$ and $1 \times 10^{12}$ bacteria according to cfu, or between $1 \times 10^3$ and $1 \times 10^{11}$ cfu, or between $1 \times 10^4$ and $1 \times 10^{10}$ cfu, or between $1 \times 10^5$ and $1 \times 10^9$ cfu, or between $1 \times 10^8$ and $1 \times 10^8$ cfu. Most preferably the composition for use according to the invention contains between $1 \times 10^6$ to $1 \times 10^7$ cfu. The precise amount of a microorganism in an immunogenic composition or vaccine effective to provide a protective effect can be determined by a skilled artisan. Effective doses of the therapeutic compositions and agents of the present invention vary depending upon many different factors, including means of administration, target site, physiological state of the vertebrate, whether the patient is a human or an animal, and whether there are any other concomitant medications. Appropriate dosages need to be titrated to optimize safety and efficacy. The amount of immunogen depends on whether adjuvant is also administered, with higher dosages being required in the absence of adjuvant. The timing of administrations can vary significantly from once a day, to once a year, to once a decade. A typical regimen consists of an immunization followed by booster administrations at 6 weekly intervals. Another regimen consists of an immunization followed by booster administrations 1, 2 and 12 months later. Another regimen consists of an administration every two months for life. Alternatively, booster administrations can be provided on an irregular basis as indicated by monitoring of immune response. In a preferred embodiment, the regimen consists of administrations every four weeks, preferably two administrations every four weeks.

In a particular embodiment, the composition for use according to the invention does not comprise an adjuvant. In a preferred embodiment, the composition is in PBS.

In a particular embodiment, the composition for use according to the invention comprises an adjuvant. The term "adjuvant", as used herein, refers to a substance which, when added to an immunogenic agent, nonspecifically enhances or potentiates an immune response to the agent in a recipient host upon exposure to the mixture. Suitable adjuvants include, without limitation, adjuvants formed by aluminum salts (alum), such as aluminum hydroxide, aluminum phosphate, aluminum sulfate, etc, formulations of oil-in-water or water-in-oil emulsions such as complete Freund's Adjuvant (CFA) as well as the incomplete Freund's Adjuvant (IFA); mineral gels; block copolymers, Avridine™, SEAM62, adjuvants formed by components of the bacterial cell wall such as adjuvants including liposaccharides (e.g., lipid A or Monophosphoryl Lipid A (MLA), trehalose dimycolate (TDM), and components of the cell wall skeleton (CWS), heat shock proteins or the derivatives thereof, adjuvants derived from ADP-ribosylating bacterial toxins, which include diphtheria toxin (DT), pertussis toxin (PT), cholera toxin (CT), *E. coli* heat-labile toxins (LT1 and LT2), *Pseudomonas* Endotoxin A and exotoxin, *B. cereus* exoenzyme B, *B. sphaericus* toxin, *C. botulinum* toxins C2 and C3, *C. limosum* exoenzyme as well as the toxins of *C. perfringens, C. spiriforma* and *C. difficile, S. aureus*, EDIM and mutants of mutant toxins such as CRM-197, non-toxic mutants of diphtheria toxin; saponins such as ISCOMs (immunostimulating complexes), chemokines, quimiokines and cytokines such as interleukins (IL-I 1L-2, IL-4, IL-5, IL-6, IL-7, IL-8, IL-12, etc), interferons (such as the interferon gamma) macrophage colony stimulating factor (M-CSF), tumor necrosis factor (TNF), defensins 1 or 2, RANTES, MIPI-alpha, and MEP-2, muramyl peptides such as N-acetyl-muramyl-L-threonyl-D-isoglutamine (thr-MDP), N-acetyl-normuramyl-L-alanyl-D-isoglutamine (nor-MDP), N-acetylmuramyl-L-alanyl-D-isoglutaminyl-L-alanine-2-(1'-2'-dipalmitoyl-s-n-glycero-3-hydroxyphosphoryloxy)-ethylamine (MTP-PE) etc; adjuvants derived from the family of CpG molecules, CpG dinucleotides and synthetic oligonucleotides which comprise CpG motifs, *C. limosum* exoenzyme and synthetic adjuvants such as PCPP, the cholera toxin, *Salmonella* toxin, alum and the like, aluminum hydroxide, N-acetyl-muramyl-L-threonyl-D-isoglutamine (thr-MDP), N-acetyl-nor-muramyl-L-alanyl-D-isoglutamine, MTP-PE and RIBI, containing three components extracted from bacteria, monophosphoryl lipid A, trehalose dimycolate and cell wall skeleton (MPL+TDM+CWS) in a squalene emulsion at 2% Tween 80. Other examples of adjuvants include DDA (dimethyl dioctadecyl ammonium bromide) and Qui1A. In a particular embodiment the adjuvant is an oily adjuvant of manide oleate and mineral oil. In another embodiment, the adjuvant is a water-in-oil emulsion.

In an embodiment, the composition does not contain an antigen derived from an infectious agent other than *Mycobacterium*, preferably does not contain an antigen derived from the infectious agent that causes the infection to be prevented.

The expression "an antigen derived from an infectious agent" means that the antigen is obtained from a specific infectious agent (i.e., a specific infectious agent is the source of the antigen) or is a synthetic analogue thereof, such that the antigen derived from the infectious agent is recognized by the same antibody or antibodies as the antigen still forming part of the infectious agent of origin.

In another embodiment, the composition does not comprise an antigen selected from the group consisting of an antigen derived from dornase, levedurin, oidiomycin, prions, streptokinases, *Streptococcus* toxoid, diphtheria toxoid, tetanus toxoid, inactivated *Ascaris lumbricoides* lysates, *Aspergillus* spp., *Aspergillus flavus*, *Aspergillus fumigatus*, *Aspergillus terreus*, *Candida* spp., *Candida albicans*, *Candida glabrata*, *Candida parapsilosis*, *Chlamydia* spp., *Chlamydia pneumoniae*, *Chlamydia psittaci*, *Chlamydia trachomatis*, *Cryptosporidium* spp., dermatophytes, *Entamoeba hystolitica*, *Enterobius vermicularis*, *Enterococcus faecalis*, *Epidermophyton floccosum*, *Escherichia coli*, *Giardia lamblia*, *Haemophilus influenzae*, *Microsporum canis*, *Mycobacterium leprae*, *Mycobacterium tuberculosis*, *Neisseria gonorrhoeae*, Human papillomavirus, Polio virus, *Proteus* spp., *Proteus mirabilis*, *Proteus penerii*, *Proteus vulgaris*, *Salmonella* spp., *Salmonella bongori*, *Salmonella enterica*, *Serratia* spp., *Serratia liquefaciens*, *Serratia marcencens*, *Shigella* spp., *Shigella flexneri*, *Shigella sonnei*, *Staphylococcus* spp., *Staphylococcus aureus*, *Staphylococcus epidermidis*, *Strongyloides stercoralis*, *Streptococcus* spp., *Streptococcus bovis*, *Streptococcus viridans*, *Streptococcus equinus*, *Streptococcus pneumoniae*, *Streptococcus pyogenes*, *Toxoplasma gondii*, *Trichomonas vaginalis*, trichophytin, *Trichophyton* spp., *Trichophyton rubrum*, *Trichophyton tonsurans*, *Trichophyton mentagrophytes*, yellow fever virus, hepatitis B virus, rubella virus, varicella zoster virus, variola virus, mumps virus, measles virus, herpetic virus, vaccinia virus, synthetic analogues of said antigens and combinations thereof.

Preferably, the composition of the invention does not comprise a lysate, preferably an inactivated lysate, selected from the group consisting of a lysate from *Ascaris lumbricoides*, *Aspergillus* spp., *Aspergillus flavus*, *Aspergillus fumigatus*, *Aspergillus terreus*, *Candida* spp., *Candida albicans*, *Candida glabrata*, *Candida parapsilosis*, *Chlamydia* spp., *Chlamydia pneumoniae*, *Chlamydia psittaci*, *Chlamydia trachomatis*, *Cryptosporidium* spp., dermatophytes, *Entamoeba hystolitica*, *Enterobius vermicularis*, *Enterococcus faecalis*, *Epidermophyton floccosum*, *Escherichia coli*, *Giardia lamblia*, *Haemophilus influenzae*, *Microsporum canis*, *Mycobacterium leprae*, *Mycobacterium tuberculosis*, *Neisseria gonorrhoeae*, Human papillomavirus, Polio virus, *Proteus* spp., *Proteus mirabilis*, *Proteus penerii*, *Proteus vulgaris*, *Salmonella* spp., *Salmonella bongori*, *Salmonella enterica*, *Serratia* spp., *Serratia liquefaciens*, *Serratia marcencens*, *Shigella* spp., *Shigella flexneri*, *Shigella sonnei*, *Staphylococcus* spp., *Staphylococcus aureus*, *Staphylococcus epidermidis*, *Strongyloides stercoralis*, *Streptococcus* spp., *Streptococcus bovis*, *Streptococcus viridans*, *Streptococcus equinus*, *Streptococcus pneumoniae*, *Streptococcus pyogenes*, *Toxoplasma Trichomonas vaginalis*, trichophytin, *Trichophyton* spp., *Trichophyton rubrum*, *Trichophyton tonsurans*, *Trichophyton mentagrophytes*, yellow fever virus, hepatitis B virus, rubella virus, varicella zoster virus, variola virus, mumps virus, measles virus, herpetic virus, vaccinia virus and combinations thereof.

In another embodiment, the composition of the invention does not comprise any protozoan or protozoan lysate from the genus selected from the group consisting of *Acanthamoeba*, *Babesia*, *Balamuthia*, *Balantidium*, *Blastocystis*, *Cryptosporidium*, *Cyclospora*, *Dientamoeba*, *Entamoeba*, *Giardia*, *Isospora*, *Leishmania*, *Naegleria*, *Plasmodium*, *Rhinosporidium*, *Sarcocystis*, *Toxoplasma*, *Trichomonas*, *Trypanosoma* and combinations thereof. In another embodiment, the composition of the invention does not comprise a bacteria or bacterial lysate from the genus selected from the group consisting of *Acinetobacter*, *Actinobacillus*, *Aeromonas*, *Aggregatibacter*, *Agrobacterium*, *Anaplasma*, *Bacillus*, *Bordetella*, *Borrelia*, *Brucella*, *Burkholderia*, *Campylobacter*, *Chlamydia*, *Chromobacterium*, *Clostridium*, *Corynebacterium*, *Cyanobacteria*, *Enterobacter*, *Enterococcus*, *Erwinia*, *Escherichia*, *Francisella*, *Fusobacterium*, *Haemophilus*, *Helicobacter*, *Klebsiella*, *Lactobacillus*, *Legionella*, *Listeria*, *Micrococcus*, *Moraxella*, *Mycoplasma*, *Neisseria*, *Nitrosomas*, *Nocardia*, *Obesumbacterium*, *Pantoea*, *Pasteurella*, *Pediococcus*, *Porphyromonas*, *Prevotella*, *Proteus*, *Pseudomonas*, *Ralstonia*, *Rickettsia*, *Rhisobium*, *Rhodobacter*, *Salmonella*, *Serratia*, *Shigella*, *Staphyllococcus*, *Streptococcus*, *Tannerella*, *Treponema*, *Tsukamurella*, *Vibrio*, *Xenorhabdus*, *Yersinia* and combinations thereof.

In another embodiment, the composition of the invention does not comprise an antigen selected from the group consisting of an antigen derived from a bacteria belonging to the genera *Staphylococcus*, *Streptococcus*, *Enterococcus*, *Corynebacterium*, *Bacillus*, *Listeria*, *Clostridium*, *Actinomyces*, *Nocardia*, *Escherichia*, *Proteus*, *Klebsiella*, *Serratia*, *Enterobacter*, *Salmonella*, *Shigella*, *Pseudomonas*, *Burkholderia*, *Stenotrophomonas*, *Acinetobacter*, *Vibrio*, *Campylobacter*, *Helicobacter*, *Bacteroides*, *Neisseria*, *Moraxella*, *Haemophilus*, *Bordetella*, *Brucella*, *Francisella*, *Pasteurella*, *Yersinia*, *Legionella*, *Gardnerella*, *Treponema*, *Leptospira*, *Borrelia*, *Mycoplasma*, *Rickettsia*, *Chlamydia*, a synthetic analogue of said antigens and combinations thereof; or an antigen derived from a virus belonging to the families Adenoviridae, Arenaviridae, Bunyaviridae, Coronaviridae, Filoviridae, Flaviviridae, Hepadnaviridae, Deltavirus, Caliciviridae, Herpesviridae, Orthomyxoviridae, Papovaviridae, Paramyxoviridae, Parvoviridae, Picornaviridae, Poliovirus, Poxyviridae, Reoviridae, Retroviridae, Rhabdoviridae, Togaviridae, a synthetic analogue of said antigens and combinations thereof; or an antigen derived from a fungi and yeast belonging to the genera *Sporothrix, Aspergillus, Blastomyces, Candida, Coccidioides, Cryptococcus, Histoplasma, Pneumocystis*, a synthetic analogue of said antigens and combinations thereof; or an antigen derived from a protozoa belonging to the genera *Criptosporidia, Ciclospora, Entamoeba, Naegleria, Giardia, Leishmania, Plasmodium, Toxoplasma, Trichomonas, Trypanosoma, Microsporidia, Isospora*, a synthetic analogue of said antigens and combinations thereof; or an antigen derived from a helminth, trematode, cestode, nematode, a synthetic analogue of said antigens and combinations thereof.

In another embodiment the *Mycobacterium* is the only immunogen of the composition.

In a particular embodiment, the composition for use according to the invention is administered as part of a pharmaceutical product, a veterinary product, a feed product, or a nutritional product.

As used in the present invention, the expression "pharmaceutical composition" refers to a formulation which has been adapted to administer a predetermined dose of one or several therapeutically useful agents to a cell, a group of cells, an organ, a tissue or an animal in which a direct or indirect therapeutic effect of the composition is sought out. The pharmaceutical composition of the invention contains a pharmaceutical effective amount of a composition, which is understood herein as an amount capable of providing a therapeutic effect, and which can be determined by the person skilled in the art by commonly used means. The amount of the inactivated *Mycobacterium* for use according to the invention or a fraction thereof will vary depending upon the subject and the particular mode of administration. Those skilled in the art will appreciate that dosages may also be determined with guidance from Goodman and Goldman's The Pharmacological Basis of Therapeutics, Ninth Edition (1996), Appendix II, pp. 1707-1711 and from Goodman and Goldman's The Pharmacological Basis of Therapeutics, Tenth Edition (2001), Appendix II, pp. 475-493.

The compositions may be for human or animal usage in human and veterinary medicine and will typically comprise any one or more of a pharmaceutically acceptable diluent, carrier, or excipient. The term "carrier" refers to a diluent or excipient with which the active ingredient is administered. Acceptable carriers or diluents for therapeutic use are well known in the pharmaceutical art, and are described, for example, in Remington's Pharmaceutical Sciences, Mack Publishing Co. (A. R. Gennaro edit. 1985). The choice of pharmaceutical carrier, excipient or diluent can be selected with regard to the intended route of administration and standard pharmaceutical practice. For example, such pharmaceutical carriers can be sterile liquids, such as water and oils, including those of petroleum, animal, plant or synthetic origin, such as peanut oil, soybean oil, mineral oil, sesame oil and the like. Water or aqueous solutions of saline solution and aqueous dextrose and glycerol solutions, particularly for injectable solutions, are preferably used as carriers. The compositions may comprise as—or in addition to—the carrier, excipient or diluent any suitable binder(s), lubricant(s), suspending agent(s), coating agent(s), solubilizing agent(s). Preservatives, stabilizers, dyes and even flavoring agents may be provided in the pharmaceutical composition. Examples of preservatives include sodium benzoate, sorbic acid and esters of p-hydroxybenzoic acid. Antioxidants and suspending agents may also be used. There may be different composition/formulation requirements depending on the different delivery systems.

In a particular embodiment the composition is administered as part of a nutritional composition or nutraceutical comprising the composition for use according to the invention. The term "nutritional composition" of the present invention relates to the food that beneficially affects one or more functions of the body, so as to provide better health and wellness. Accordingly, such a nutritional composition may be intended for the prevention and/or treatment of a disease or a disease causing factor. Therefore, the term "nutritional composition" of the present invention can be used as a synonym for functional food or foods for particular nutritional purposes, or medical food. A nutritional composition is similar to that of a conventional food and consumed as part of a normal diet appearance. Preferably, the feed or nutritional product comprises at least between 0.1% and 99.9%, between 1% and 99%, between 10% and 90%, between 20% and 80%, between 30% and 70%, between 40% and 60% of the inactivated *Mycobacterium* for use according to the invention or fraction thereof. Non-limiting examples of suitable foodstuffs which can be used in the present invention are cereals, fermented cereal based products, other cereal based powders, clinical nutrition formula, bread, cakes or candies, animal feed formulations, semi- or synthetic diet formulations, infant formulae, clinical nutrition formulae, flours, bread, cakes, candies or chewing-gums. By "nutraceutical", a word derived from nutrition and pharmaceutical, relates to a product made from a food, but which can be found in pill form, a powder and/or any other dosage forms not usually associated with food and having beneficial properties for the treatment and/or prevention of diseases.

In a particular embodiment the composition is administered as part of an animal feed. The term "animal feed" includes all the natural materials and finished products of any origin which, separately or conveniently mixed with one another, are suitable for, or intended for intake by an animal. Animal feed for a monogastric animal typically comprises concentrates as well as vitamins, minerals, enzymes, direct fed microbial, amino acids and/or other feed ingredients (such as in a premix) whereas animal feed for ruminants generally comprises forage (including roughage and silage) and may further comprise concentrates as well as vitamins, minerals, enzymes direct fed microbial, amino acid and/or other feed ingredients (such as in a premix). An animal feed additive is a formulated enzyme product which may further comprise e.g. vitamins, minerals, enzymes, amino acids, preservatives and/or antibiotics; i.e. a premix. The animal feed additive/premix is typically mixed in a feed mill with concentrates and/or forage such as vegetable protein, legumes or other plant material. The animal feed is typically fed as a pelleted feed to mono-gastric animals. Examples of animals are non-ruminants and ruminants. Ruminant animals include, for example, animals such as sheep, goats, cattle, e.g. beef cattle, cows, and young calves, deer, yank, camel, llama and kangaroo. Non-ruminant animals include monogastric animals, including but not limited to pigs or swine (including, but not limited to, piglets, growing pigs, and sows); poultry such as turkeys, ducks, quail, guinea fowl, ostrich, geese, pigeons (including squabs) and chicken (including but not limited to broiler chickens (referred to herein as broiles), chicks, layer hens (referred to herein as layers)); horses (including but not limited to hotbloods, coldbloods and warm bloods).

In a particular embodiment, the invention refers to compositions for use according to the invention in a lyophilized, freeze-dried or dried form, which can be obtained by any conventional method known in the art.

The invention will be described by way of the following examples which are to be considered as merely illustrative and not limitative of the scope of the invention.

EXAMPLES

1. Preparation of the Immunostimulant.

The *M. bovis* field isolate MB4 originally obtained from a naturally infected wild boar was used for *M. bovis* inactivated vaccine (IV) preparation. *M. bovis* IV was prepared following the methodology described previously (Garrido et al., 2011, Protection against tuberculosis in Eurasian wild boar vaccinated with heat-inactivated *Mycobacterium bovis*. PLoS One 6: e24905). The *M. bovis* strain used is a first passage level culture isolated from a naturally infected wild boar in Coletsos medium. Before inactivation, ten-fold serial dilutions were prepared and plated on agar-solidified 7H9 with OADC in quadruplicate to assess the number of CFUs in the inoculum. The inoculum was inactivated using a water bath at 80-85° C. for 30-45 minutes. Four aliquots of the inactivated vaccine were cultured to confirm the absence of viable *M. bovis*. Vials of immunostimulant were adjusted to approximately $10^7$ bacteria according to colony-forming units (CFU) counts/ml in phosphate-buffered saline (PBS).

The *M. bovis* field isolate MB4's genomic sequence has been deposited in the European Nucleotide Archive under the accession numbers CDHE01000001 to CDHE01000118 (de la Fuente et al., *Complete Genome Sequences of Field Isolates of Mycobacterium bovis and Mycobacterium caprae*, Genome Announc, May/June 2015 Vol. 3, Issue 3, e00247-15, and de la Fuente et al., *Comparative Genomics of Field Isolates of Mycobacterium bovis and M. caprae Provides Evidence for Possible Correlates with Bacterial Viability and Virulence*, PLoS Negl Trop Dis 9(11): e0004232).

2. Immunoprotector Effect Against Malaria Parasite, *Plasmodium* Spp.

2.1. Study Design

Five weeks old female Balb/c mice (N=3/group) were obtained. Mice were treated with two doses of 0.05 ml each containing 500.000 bacteria according to CFU counts in PBS one month apart. Control groups were treated with two doses of 0.05 ml PBS, one month apart. After immunization, an intraperitoneal inoculation of $10^7$ *Plasmodium berghei* ANKA parasitized red blood cells was performed to a group or left uninfected as control.

Mice blood smears were obtained to determine parasitemia, using light microscopy after staining with Hemacolor® kit (EMD Millipore, Germany). When the parasitemia reached >10% and exflagellation was observed (4-6 exflagellations/field), mice were euthanized to collect liver and blood samples to check for *Plasmodium* infection. RNA was immediately extracted using GRS FullSample Purification Kit (GRiSP, Porto, Portugal), quantified using a ND-1000 Spectrophotometer (NanoDrop ND1000, Thermo Fisher Scientific, Whaltman, MA) and stored at −80° C. Using three biological replicates of each condition (treated and non-treated), total RNA (50 ng/μL for each mice sample) was used to synthesize cDNA using the iScript™ cDNA Synthesis Kit (Bio-Rad, CA, USA). qPCR reactions of 10 μl were performed in triplicate using IQ™ SYBR® Green Supermix kit (Biorad, CA, USA) in a CFX96 Touch Real-time PCR (Bio-Rad, CA, USA) thermocycler. The following conditions were used: an initial cycle of denaturation at 95° C. for 10 min; followed by 45 cycles of 95° C. for 15 seconds and 55° C. for 45 seconds to amplify *Plasmodium* 18s rRNA. Fluorescence readings were taken at 62° C. after each cycle and a melting curve (60-95° C.) was performed. To determine the reaction efficiency, standard curves were constructed with 5-fold serial dilutions of cDNA synthesized from total RNA from a pool of samples. Relative expression levels of mice samples were normalized using the Arbp0 (55° C.) and ribosomal protein S7 (60° C.) as reference gene, and gene expression was analysed by the CFX Manager™ Software (Bio-Rad, CA, USA). Results from treated and control mice were compared by Mann-Whitney test for non-parametric values ($P<0.05$).

2.2. Results

The parasitemia percentage was significantly reduced in the treated mice when compared to controls ($p<0.05$) at day 3 post-infection. Specifically, a delay of 1 day was observed in the three mice treated with the heat-inactivated immunostimulant of *M. bovis* (FIG. 1).

Relative levels of *Plasmodium berghei* levels in liver and blood from treated mice were significantly lower in comparison with the control mice ($p<0.001$ and $p<0.01$, respectively) at the end of the experiment (FIG. 2).

3. Immunoprotector Effect Against Leishmaniasis Parasite, *Leishmania* Spp.

3.1. Study Design

Eighteen female Balb/c mice four weeks old (N=9/group) were used in this study. Treated mice received orally two doses of inactivated *M. bovis* of 0.05 ml each containing 500.000 bacteria according to CFU counts at an interval of 4 weeks. Control groups were administered two doses of 0.05 ml PBS, one month apart. All mice were subsequently infected by intraplantar inoculation in the right feet with 10,000 promastigotes of *Leishmania amazonensis* in a final volume of 0.05 ml 4 weeks after the second immunization dose.

The growth of the lesions was determined weekly by measuring the diameters of the right and left feet with a metric caliper until measure was 3 times the pre-inoculation value being in that moment euthanized and submitted to necropsy.

Besides clinical observation of the experimental mice, at the end of the experiment the anti-leishmanial efficacy of the immunostimulant was estimated by determining the parasite burden by limiting dilution assay as previously described (Buffet et al., 1995, Culture microtitration: a sensitive method for quantifying *Leishmania infantum* in tissues of infected mice. Antimicrob Agents Chemother 39: 2167-2168). Briefly, popliteal lymph nodes and spleens were removed, weighed and homogenized in Schneider's medium (Sigma-Aldrich, Misuri, USA) supplemented with 20% heat-inactivated FBS, 2% sterile human urine, 20 mM HEPES, 1% L-glutamine and 100 U/mL penicillin+100 mg/mL streptomycin (Lonza Group, Basel, Switzerland). Organ homogenates were filtered through a cell strainer to ensure a single-cell suspension. Further dilutions of the homogenate were done in the same medium to a final concentration of 10 mg/mL; 200 mL/well of this cell suspension was added to the first well of a 96-well culture plate (Corning Inc., NY, USA) and serial 4-fold dilutions were made across the plate. Plates were incubated for 2 weeks at 26° C. and the presence of parasites was assessed by microscopy. The parasite burden (number of parasites/g of organ) was calculated as described (Buffet et al., 1995, Culture microtitration: a sensitive method for quantifying *Leishmania infantum* in tissues of infected mice. Antimicrob Agents Chemother 39: 2167-2168).

Formalin-fixed samples from popliteal lymph node, spleen and right footpad were dehydrated through a graded series of alcohol to xylol, embedded in paraffin wax and routinely processed for immunohistochemistry (IHC) using the avidin-biotin-peroxidase complex (ABC) method. Briefly, endogenous peroxidase activity was exhausted by incubation with 0.3% hydrogen peroxide in methanol for 30 minutes at room temperature (approx. 25° C.). Sections were covered with 20% normal goat serum (Vector Laboratories, Burlingame, CA, USA) in 0.01M phosphate-buffered saline (PBS) at room temperature for 30 minutes. After blocking, the sections were incubated with a rabbit anti-*Leishmania* spp. antibody (Courtesy of Instituto de Salud Carlos III, Majadahonda, Spain) in a 1:50 dilution at 4° C. overnight (approx. 18 hours). The sections were then incubated for 30 minutes at room temperature with biotinylated goat anti-rabbit IgG secondary Ab (Vector Laboratories) diluted 1:200 in 0.05 M Tris buffered saline (TBS; pH 7.6) containing 10% normal goat serum. All tissue sections were finally treated with ABC complex (Vectastain ABC Elite Kit; Vector Laboratories) for 1 hour at room temperature, then rinsed in TBS and incubated with the chromogen solution (NovaRED Substrate Kit; Vector Laboratories). Finally, slides were counterstained with Harris's hematoxylin. Quantitative assessment of the amastigotes in fields of 0.2 mm$^2$ was performed.

Results from treated and control mice were compared by Mann-Whitney test for non-parametric values (P<0.05).

3.2. Results

The animals presented edema and necrosis with an increase of the right footpad thickness along 60 days approx. after the parasite inoculation in both groups. The mean growth of the foot lesion was increasing over the period evaluated. However, the immunization with a heat-inactivated immunostimulant of *M. bovis* orally-delivered did not result in a less pronounced increase of the foot thickness during the experiment, and non-significant differences between groups were observed (FIG. 3).

In culture, the promastigotes appear in popliteal lymph node at 24 hours and in spleen at 4 days. These promastigotes were kept until 21 days of incubation. In popliteal lymph node, the positive isolation was observed in all mice of both groups, confirming the infection. However, in the spleen we found significant differences between both infected groups (p<0.05); thus, the isolation of promastigotes was observed in all mice of the control group (100%) but only in 5/9 mice of the treated group (55%). Spleen and popliteal lymph node burdens of *Leishmania* were higher in the control group than those seen in the treated group, although this reduction of the promastigotes burden in the treated group was not significant (P>0.05) (FIG. 4).

The reduction in amastigotes of *Leishmania* detected in situ by IHC in popliteal lymph node was significant (P=0.092) in the treated mice compared with controls (FIG. 5). Immunohistochemical detection of *Leishmania* spp. antigen was performed in the left footpad, but the higher number of amastigotes in this localization in all infected animals made impossible their quantification.

4. Immunoprotector Effect Against Lyme Disease Bacteria, *Borrelia burgdorferi*.

4.1. Study Design

Twelve female C3H/HeN mice six weeks old (N=5/group) were treated orally with two doses of inactivated *M. bovis* of 0.05 ml each containing 500.000 bacteria according to CFU counts at an interval of 4 weeks. Control groups were administered two doses of 0.05 ml PBS, one month apart. All mice were subsequently infected by subcutaneous injections of $10^5$ spirochetes in 100 μl of BSK-H medium per mouse. Strains used for infection of laboratory mice were characterized and selected on the basis of their ospC types as was previously described (Rudenko et al., 2013, Detection of *Borrelia burgdorferi* sensu stricto ospC alleles associated with human Lyme borreliosis worldwide in non-human-biting tick *Ixodes affinis* and rodent hosts in southeastern United States. Appl Environ Microbiol 79:1444-1453).

Presence of spirochetes in ear biopsies was determined at weekly intervals by PCR in order to determine the end point of the experiment. At the 3rd week after infection, the presence of spirochetes was confirmed in all ear biopsy samples regardless the ospC type of the strain used for infection. At week 6th, mice were euthanized and submitted to necropsy, and samples from joint, bladder, heart, spleen and ear were obtained.

Detection of *B. burgdorferi* infection was performed using direct PCR amplification of *B. burgdorferi* DNA from murine tissue material. Total DNA from murine samples was purified using the DNeasy tissue kit (Qiagen, Hilden, Germany) strictly according to the manufacturer's recommendations. The MasterTaq kit (Eppendorf, Hamburg, Germany) was used for nested PCR amplification of fragments of flagellin gene using the following previously described gene-specific primers: Fla out F-5'-AARGAATTGGCAGTTCAATC-3' (SEQ ID NO: 1) and Fla out R-5'-GCATTTTCWATTTTAGCAAGTGATG-3' (SEQ ID NO: 2) and Fla inn F-5'-ACATATTCAGATGCAGACAGAGGTTCTA-3' (SEQ ID NO: 3), and Fla inn R-5'-GAAGGTGCTGTAGCAGGTGCTGGCTGT-3' (SEQ ID NO: 4) (Clark et al., 2005, Molecular identification and analysis of *Borrelia burgdorferi* sensu lato in lizards in the southeastern United States. Appl Environ Microbiol 71:2616-2625). All Q-PCR assays were performed with a LightCycler 480 (Roche, Basel, Switzerland). FastStart Universal SYBR Green Master (ROX) from Roche and gene-specific primers FlaF1 (AAGCAAATTTAGGTGCTTTCCAA) (SEQ ID NO: 5) and FlaR1 (GCAATCATTGCCATTGCAGA) (SEQ ID NO: 6) were used to amplify a 154-bp length fragment with a program consisting of an initial denaturing step of 3 min at 95° C. and 50 amplification cycles with 30 s at 95° C. followed by 1 min at 60° C. The forward and reverse primers used for Q-PCR analysis of mouse β-actin housekeeping gene were 5'-AGA GGG AAA TCG TGC GTG AC-3' (SEQ ID NO: 7) and 5'-CAA TAG TGA TGA CCT GGC CGT-3' (SEQ ID NO: 8), respectively. Spirochete burden in tissues was normalized to mouse actin using previously described methods (Dai et al., 2009, Antibodies against a tick protein, Salp15, protect mice from the Lyme disease agent. Cell Host Microbe 6:482-492). Quantification was performed using the comparative CT method (Sequence Detector User Bulletin 2; Applied Biosystems) and reported as the fold difference relative to the housekeeping gene. To calculate the fold change (increase or decrease), the CT of the housekeeping gene (murine β-actin) was subtracted from the CT of the target gene to yield the ΔCT.

Results from treated and control mice were compared by Mann-Whitney test for non-parametric values (P<0.05).

4.2. Results

The *B. burgdorferi* load was reduced in the treated mice compared with controls, but differences were not always significant. Thus, the immunization with IV of *M. bovis* in mice carried out a significant decrease of *B. burgdorferi* in tissues of 61% in joint (preferable site for spirochete accumulation), 57.4% in bladder and 47.5% in heart (FIG. 6). Blood samples were excluded from experiments due to the insufficient concentration of the DNA extracted.

5. Immunoprotector Effect Against Salmonellosis Bacteria, *Salmonella enterica*.

5.1. Study Design

Thirty Landrace x Large White hybrid female piglets of 10 days of age with homogeneous weights, obtained from a pig production farm, were used. Nine animals were treated orally with the water soluble fraction of "alperujo" (a solid by-product of the two-phase centrifugation method for olive oil extraction) and subsequently infected with *S. enterica* by intratracheal route. Nine animals were treated orally with two doses of inactivated *M. bovis* of 2 ml each containing $10^7$ bacteria according to CFU counts/ml at an interval of 4 weeks (treated group) and nine animals were not treated (control group). All of them were infected by intratracheal route with $10^6$ CFU of *S. enterica* in a final volume of 1 ml 4 weeks after the second immunization dose. Other three animals were not treated or infected with *S. enterica* (non-infected group).

Samples were collected from all individuals at 0, 1, 2, 7, 14 and 21 days post infection (dpi). Weight was measured on the first day of each week (day 0, 7, 14, 21 dpi). After these 21 days, the animals were euthanized and submitted to necropsy for postmortem examination. Results from treated and control mice were compared by Mann-Whitney test for non-parametric values (P<0.05).

5.2. Results

Regarding the clinical incidences observed during the study, it should be noted that respiratory difficulties, including sneezing and coughing, began to be observed from 2 dpi. Most of the symptoms were immunostimulant between 8 and 14 dpi with clear clinical signs of depression and apathy in the infected groups, although more generalized in the control group than the treated group. The percentage of animals with clinical signs was also higher in the control group (FIG. 7).

The weight of the animals increased progressively throughout the experience in all groups (FIG. 8). The animals of the non-infected control group are those that reach the highest weight, followed by the animals of the treated group, while the animals of the control group presented the lower weights. At 21 dpi, the treated group had a mean of 3.25 kg more than the control group. Although there were slight differences, statistically significant values were observed between treated group compared to the control group from 7 dpi.

The animals not treated and challenged with *S. enterica* (control group) presented severe pneumonia with necrotic foci affecting four or more lobes, hydrothorax, hydropericarditis, congestive mediastinal nodes and congestion of the gastric fundic mucosa, splenomegaly, hepatomegaly, mesenteric and gastrohepatic adenomegaly. However, the animals treated and challenged with *S. enterica* (treated group) presented only moderate vascular changes, slight broncopneumonia that affected a minor number of lobes and congestive mediastinal nodes with some necrotic areas. The non-infected animals did not show lesions compatible with the infection with *S. enterica* (FIG. 9).

The invention claimed is:

1. A method for the prevention of an infection in a subject, wherein the infection is selected from the group consisting of a protozoan parasitic infection and a bacterial infection with the proviso that the infection is not caused by a *Mycobacterium*, that comprises administering to a subject in need thereof a composition comprising an inactivated *Mycobacterium bovis* or a fraction thereof, wherein the composition does not contain an antigen derived from an infectious agent other than *Mycobacterium*, and wherein the composition is administered by oral, subcutaneous, intramuscular route, or combinations thereof.

2. The method according to claim 1, wherein the *Mycobacterium bovis*, is *M. bovis* field isolate MB4 (European Nucleotide Archive accession numbers CDHE01000001 to CDHE01000118) or *M. bovis* BCG.

3. The method according to claim 1, wherein the *Mycobacterium bovis* is inactivated through a process selected from the group consisting of thermal inactivation, microwave inactivation, pressure inactivation, acid inactivation, base inactivation, ethanol inactivation and peroxide inactivation.

4. The method according to claim 3, wherein the *Mycobacterium* is inactivated through thermal inactivation.

5. The method according to claim 4, wherein the thermal inactivation process comprises heating the *Mycobacterium* in a water bath at a temperature between 80° C. and 85° C. for a period between 30 minutes and 45 minutes.

6. The method according to claim 1, wherein the protozoan parasitic infection is caused by a protozoan from the genus selected from the group consisting of *Acanthamoeba, Babesia, Balamuthia, Balantidium, Blastocystis, Cryptospo-* ridium, Cyclospora, Dientamoeba, Entamoeba, Giardia, Isospora, Leishmania, Naegleria, Plasmodium, Rhinosporidium, Sarcocystis, Toxoplasma, Trichomonas, Trypanosoma and combinations thereof; or wherein the bacterial infection is caused by a bacterium from the genus selected from the group consisting of *Acinetobacter, Actinobacillus, Aeromonas, Aggregatibacter, Agrobacterium, Anaplasma, Bacillus, Bordetella, Borrelia, Brucella, Burkholderia, Campylobacter, Chlamydia, Chromobacterium, Clostridium, Corynebacterium, Cyanobacteria, Enterobacter, Enterococcus, Erwinia, Escherichia, Francisella, Fusobacterium, Haemophilus, Helicobacter, Klebsiella, Lactobacillus, Legionella, Listeria, Micrococcus, Moraxella, Mycoplasma, Neisseria, Nitrosomas, Nocardia, Obesumbacterium, Pantoea, Pasteurella, Pediococcus, Porphyromonas, Prevotella, Proteus, Pseudomonas, Ralstonia, Rickettsia, Rhisobium, Rhodobacter, Salmonella, Serratia, Shigella, Staphyllococcus, Streptococcus, Tannerella, Treponema, Tsukamurella, Vibrio, Xenorhabdus, Yersinia* and combinations thereof.

7. The method according to claim 6, wherein the protozoan parasitic infection is caused by a protozoan selected from the group consisting of *Acanthamoeba* spp., *Balamuthia mandrillaris, Babesia divergens, Balantidium coli, Blastocystis* spp., *Cryptosporidium* spp., *Cyclospora cayetanensis, Dientamoeba fragilis, Entamoeba histolytica, Giardia lamblia, Isospora belli, Leishmania* spp., *Naegleria fowleri, Plasmodium berghei, Plasmodium falciparum, Plasmodium vivax, Plasmodium ovale, Plasmodium malariae, Plasmodium knowlesi, Rhinosporidium seeberi, Sarcocystis bovihominis, Sarcocystis suihominis, Toxoplasma gondii, Trichomonas vaginalis, Trypanosoma brucei, Trypanosoma cruzi* and combinations thereof; or wherein the bacterial infection is caused by a bacteria selected from the group consisting of *Aeromonas hydrophila, Aeromonas salmonicida, Acinetobacter baumannii, Aggregatibacter actinomycetemcomitans, Agrobacterium tumefaciens, Anaplasma* spp., *Bacillus anthracis, Bacillus cereus, Bacillus subtilis, Borrelia burgdorferi, Bordetella pertussis, Brucella abortus, Burkholderia cepacia, Campylobacter jejuni, Chlamydia trachomatis, Chromobacterium violaceum, Clostridium botulinum, Clostridium tetani, Corynebacterium diphtheria, Enterobacter agglomeran, Enterococcus faecalis, Erwinia carotovora, Erwinia chrysanthemi, Escherichia coli, Francisella tularensis, Fusobacterium nucleatum, Haemophilus influenzae, Helicobacter pylori, Lactobacillus Plantarum, Legionella pneumophila, Listeria monocytogenes, Klebsiella Pneumoniae, Mycoplasma pneumoniae, Micrococcus Luteus, Neisseria meningitidis, Neisseria gonorrhoeae, Nitrosomas europaea, Nocardia carnea, Obesumbacterium proteus, Pantoea stewartii, Pediococcus acidilactici, Prevotella intermedia, Porphyromonas gingivalis, Pseudomonas aureofaciens, Pseudomonas aeruginosa, Pseudomonas Phosphoreum, Pseudomonas syringae, Ralstonia solanacearum, Rhisobium etli, Rhisobium leguminosarum, Rhodobacter sphaeroides, Rickettsia* spp., *Salmonella enterica, Salmonella typhimurium, Serratia liguefaciens, Serratia marcescens, Shigella sonnei, Staphylococcus aureus, Staphylococcus epidermidis, Staphylococcus enteritis, Streptococcus pneumoniae, Tannerella forsythensis, Treponema denticola, Treponema pallidum, Tsukamurella pulmonis, Vibrio anguillarum, Vibrio fischeri, Vibrio cholerae, Vibrio harveyi, Vibrio parahaemolyticus, Vibrio alginolyticus, Vibrio vulnificus, Xenorhabdus nematophilus, Yersinia enterocolitica, Yersinia pestis, Yersinia pseudotuberculosis, Yersinia medievalis, Yersinia ruckeri* and combinations thereof.

8. The method according to claim 6, wherein the protozoan parasitic infection is caused by protozoa from the genus *Leishmania* or *Plasmodium*, or wherein the bacterial infection is caused by bacteria from the genus *Borrelia* or *Salmonella*.

9. The method according to claim 8, wherein the protozoa are *Leishmania amazonensis* or *Plasmodium berghei*, or wherein the bacteria are *Borrelia burgdorferi* or *Salmonella enterica*.

10. The method according to claim 1, wherein the subject is a vertebrate.

11. The method according to claim 1, wherein the composition is administered by the oral route.

12. The method according to claim 1, wherein the composition further comprises an adjuvant.

13. The method according to claim 1, wherein the composition is administered as part of a pharmaceutical product, a veterinary product, a feed product, or a nutritional product.

* * * * *

SEQUENCE LISTING

<160> NUMBER OF SEQ ID NOS: 8

<210> SEQ ID NO 1
<211> LENGTH: 20
<212> TYPE: DNA
<213> ORGANISM: Artificial Sequence
<220> FEATURE:
<223> OTHER INFORMATION: primer

<400> SEQUENCE: 1
aargaattgg cagttcaatc 20

<210> SEQ ID NO 2
<211> LENGTH: 25
<212> TYPE: DNA
<213> ORGANISM: Artificial Sequence
<220> FEATURE:
<223> OTHER INFORMATION: primer

<400> SEQUENCE: 2
gcattttcwa ttttagcaag tgatg 25

<210> SEQ ID NO 3
<211> LENGTH: 28
<212> TYPE: DNA
<213> ORGANISM: Artificial Sequence
<220> FEATURE:
<223> OTHER INFORMATION: primer

<400> SEQUENCE: 3
acatattcag atgcagacag aggttcta 28

```
<210> SEQ ID NO 4
<211> LENGTH: 27
<212> TYPE: DNA
<213> ORGANISM: Artificial Sequence
<220> FEATURE:
<223> OTHER INFORMATION: primer

<400> SEQUENCE: 4
gaaggtgctg tagcaggtgc tggctgt                                     27

<210> SEQ ID NO 5
<211> LENGTH: 23
<212> TYPE: DNA
<213> ORGANISM: Artificial Sequence
<220> FEATURE:
<223> OTHER INFORMATION: primer

<400> SEQUENCE: 5
aagcaaattt aggtgctttc caa                                         23

<210> SEQ ID NO 6
<211> LENGTH: 20
<212> TYPE: DNA
<213> ORGANISM: Artificial Sequence
<220> FEATURE:
<223> OTHER INFORMATION: primer

<400> SEQUENCE: 6
gcaatcattg ccattgcaga                                             20

<210> SEQ ID NO 7
<211> LENGTH: 20
<212> TYPE: DNA
<213> ORGANISM: Artificial Sequence
<220> FEATURE:
<223> OTHER INFORMATION: primer

<400> SEQUENCE: 7
agagggaaat cgtgcgtgac                                             20

<210> SEQ ID NO 8
<211> LENGTH: 21
<212> TYPE: DNA
<213> ORGANISM: Artificial Sequence
<220> FEATURE:
<223> OTHER INFORMATION: primer

<400> SEQUENCE: 8
caatagtgat gacctggccg t                                           21
```